United States Patent Office 3,491,067
Patented Jan. 20, 1970

3,491,067
ALKYLOLATED POLYURETHANE RESINS DERIVED FROM HYDROXY ETHYL CARBAMATE AND THEIR USE
Lucien Sellet, Saddle River, N.J., assignor to Diamond Shamrock Corporation, a corporation of Delaware
No Drawing. Filed July 12, 1967, Ser. No. 652,692
Int. Cl. C08g 22/04
U.S. Cl. 260—75                            4 Claims

ABSTRACT OF THE DISCLOSURE

Polyurethane treating agents are prepared by alkylolation of polyurethane resins derived from hydroxy ethyl carbamate. The polyurethane resins are obtained by reaction of hydroxy ethyl carbamate with a polyisocyanate or an isocyanate terminated prepolymer. An alcohol, phenol, polyol, polyether or a polyester may be substituted for part of the carbamate. The resins are alkylolated by reaction with an aldehyde such as formaldehyde.

---

The present invention relates to polyurethane treating agents, their preparation from (a) aldehydes and (b) polyurethane resins derived from hydroxy ethyl carbamate and utilization of these agents in the treatment of fibrous, porous and non-porous substrates.

The treating agents previously used in the treatment of substrates were usually formulated products based on polymers such as acrylates, methacrylates, their copolymers or mixtures thereof. Frequently, it was necessary to add auxiliary agents such as plasticizers, softeners, abrasion resistance improvers, antistatic agents and the like.

It is an object of the present invention to provide polyurethane treating agents for use on fibrous, porous and non-porous substrates which are obtained by alkylolation of polyurethane resins derived from hydroxy ethyl carbamate. It is a further object to provide treating agents for these substrates which bring about enhanced properties of the substrates. Another object is to provide methods of preparing polyurethane treating agents. A further object is to provide for improved textile, glass, paper, wood, metal, plastic, leather and the like treating agents which provide improved properties when applied to these materials in operations such as dyestuff and pigment binding, dyeing, coating, finishing and the like where properties such as coating, bonding, dyeability, abrasion resistance, flexibility, adhesion or the like are required. Other objects will become apparent from the detailed description given hereinafter. It is intended, however, that the detailed description and specific examples do not limit the present invention but merely indicate preferred embodiments thereof.

The above as well as other objects of this invention have been achieved in the following manner. I have prepared and used in the treatment of various fibrous, porous and non-porous substrates such as films, sheets, solids, fibers, other shapes and like materials, polyurethane treating agents which can be broadly described as reaction products of (a) aldehydes or aldehyde liberating materials and (b) polyurethane resins derived from hydroxy ethyl carbamate. These treating agents are alkylolated polyurethane resins. They are obtained by condensing from about one to about three moles of an aldehyde having from about one to about seven carbon atoms or an aldehyde liberating composition which will liberate an aldehyde having from one to seven carbon atoms with each terminal urethane group present in a polyurethane resin which is the reaction product of (a) at least about one mole of hydroxy ethyl carbamate and (b) about one mole of an organic polyisocyanate or an isocyanate terminated urethane prepolymer. When an isocyanate terminated prepolymer is used, the prepolymer is prepared by reaction of at least one hydroxyl containing compound such as a polyol, polyether or polyester having at least two terminal hydroxyl groups, with an organic polyisocyanate in a ratio of at least 1.1 isocyanate group present in the polyisocyanate per terminal hydroxyl group present in the hydroxyl containing compound. If desired, from about 0 to about one mole of a hydroxyl terminated compound such as a polyol, a polyether or a polyester having at least two terminal hydroxy groups or a monohydric alcohol or a monohydric phenol can be reacted with the hydroxy ethyl carbamate and polyisocyanate to obtain the polyurethane resin. These ingredients are reacted in such proportions and under such conditions that the resulting polyurethane resin is substantially free of reactive isocyanate groups. By reactive isocyanate groups is meant the isocyanate groups are available for reaction with hydroxyl or other reactive groups. If desired, the polyurethane resins may contain blocked or masked isocyanate groups. These isocyanate groups are not reactive isocyanate groups because they must be unblocked or unmasked before they can be reacted. The polyurethane resin is then condensed with an aldehyde or aldehyde composition to obtain an alkylolated polyurethane resin.

The alkylolated polyurethane resins can be used as treating agents directly or they can be formulated with other materials and the resulting formulations used as treating agents. For example, from about 0 to about one mole of an acid per reactive tertiary amine group present in the alkylolated polyurethane resin can be added to the resin. Further, from about 0 to about 20% by weight of a surfactant based on the weight of the alkylolated polyurethane resin can be added to the resin. Likewise, from about 0 to about one mole of an epoxide having at least eight carbon atoms per reactive hydrogen atom present in the alkylolated polyurethane resin can be added to the resin. If desired, from about 0 to about one mole of a crosslinking agent per reactive alkylol group present in the alkylolated polyurethane resin can be added to the resin. Further, from about 0 to about 40% by weight of a pigment based on the weight of the alkylolated polyurethane resin can be added to the resin. If desired, from about 0 to about 99% by weight of a solvent based on the weight of the alkylolated polyurethane resin can be added to the resin.

The polyurethane resins used in preparation of the treating agents disclosed in this invention are prepared by reacting the required amounts of hydroxy ethyl carbamate, organic polyisocyanate or isocyanate terminated urethane prepolymer and hydroxyl temrinated compound at about 25° C. to about 160° C. to obtain a polyurethane resin which is substantially free of reactive isocyanate groups. The resulting polyurethane resin is then alkylolated by reacting one mole of the resin with from about one mole to about three moles of an aldehyde per terminal urethane group present in the resin at about 5° C. to about 110° C. to obtain an alkylolated polyurethane resin. The resulting alkylolated polyurethane resin may be used directly as a treating agent or may be formulated with material such as acids, surfactants, epoxides, crosslinking agents, pigments, solvents or the like to obtain compositions useful as treating agents. These materials may be mixed with the alkylolated polyurethane resin at room temperature or at elevated temperatures provided unwanted by-products are not formed.

The treating agents are applied to a substrate, dried at about 30° F. to about 300° F. and thereafter cured by heating the dried coated substrate at a temperature of about 200° F. to about 450° F. The treating agents can be used to treat fibrous, porous and non-porous substrates. Such substrates include fiber glass, cotton, wood, metal, paper, glass, leather and the like.

The treating agents can be formulated with acids such as water soluble inorganic acids and water soluble organic acids having about one to about four carbon atoms. Further the treating agents can be formulated with surfactants such as nonionic surfactants or cationic surfactants. If desired, the treating agents can be formulated with an epoxide having at least eight carbon atoms. When desired, the treating agents can be formulated with a crosslinking agent. Such crosslinking agents react with the alkylol groups of the alkylolated resins. Suitable crosslinking agents include materials such as phenols amino groups in amino resin bases, primary amines, polyamines such as diethylenetriamine or the like. Further, the treating agent can be formulated with a pigment. When desired, the treating agent can be formulated with a solvent such as water, a water soluble alcohol, a water insoluble alcohol, a hydrocarbon such as an aliphatic hydrocarbon, a chlorinated hydrocarbon and an aromatic hydrocarbon, an ester, a ketone or the like.

Alkylolated polyurethane treating agents are unique in that they are not sensitive to water and can be used in the form of aqueous solutions or dispersions. These agents have the advantage that they contain alkylol groups such as methylol groups which are reactive when exposed to heat and/or catalyst under appropriate conditions.

Reactive alkylol groups present in alkylolated polyurethane treating agents can be reacted with (1) crosslinking agents or (2) with reactive groups such as hydroxyl groups, amino groups or the like present in the substrate. Reaction of alkylol groups with crosslinking agents produces high molecular weight polyurethane resins and reaction of alkylol groups with reactive groups present in the substrate produces chemical bonding with the substrate.

Both types of reactions with the alkylol groups present in the treating agents are highly desirable in the treatment of substrates. High molecular weight alkylolated polyurethane resins are particularly suitable for treating substrates in that they are less readily leached or removed from the substrate. Further, alkylolated polyurethane resins are especially useful in treatment of substrates in that they react with reactive groups present in the substrate and form chemical bonds between the resin and the substrate.

The preparation of polyurethane treating agents is described in greater detail below. The section entitled "*I. Preparation of Prepolymer*" describes preparation of isocyanate terminated prepolymers from organic polyisocyanates and hydroxyl terminated compounds. Isocyanate terminated prepolymers can be used instead of polyisocyanates in the preparation of polyurethane resins. The section entitled "*II. Inter-reaction of Hydroxy Ethyl Carbamate with Prepolymers*" describes the preparation of polyurethane resins using prepolymers. The section entitled "*III. Inter-reaction of Hydroxy Ethyl Carbamate with Polyisocyanates*" describes the preparation of polyurethane resins using polyisocyanates. The section entitled "*IV. Alkylolation of Polyurethane Resins*" describes alkylolation of the polyurethane resins to obtain the desired alkylolated polyurethane treating agents. Also the formulation of the alkylolated resins with acids, surfactants, epoxides, crosslinking agents, solvents, or the like is also described.

I. PREPARATION OF PREPOLYMERS

Organic polyisocyanates can be used in the form of isocyanate terminated urethane prepolymers which are prepared by reacting one or more organic polyisocyanates with a hydroxyl terminated compound having at least two terminal hydroxyl groups such as a polyol which is an alkylene polyol, a polyether which is a polyoxyalkylene polyol or a polyester. Such prepolymers are isocyanate terminated adducts of an organic polyisocyanate and a hydroxyl terminated compound having at least two terminal hydroxyl groups such as a polyol, polyether or a polyester. The sole reactive groups in these isocyanate terminated prepolymers are reactive isocyanate groups. Such isocyanate terminated urethane prepolymers are well known in the art and are frequently used instead of polyisocyanates because the prepolymers are less toxic and have lower volatilities than polyisocyanates per se.

Isocyanate terminated urethane prepolymers are prepared under anhydrous conditions by mixing one or more of the hydroxyl terminated compounds with an excess of an organic polyisocyanate and heating the resulting mixture to a temperature of from about 50° to about 100° C. to form a prepolymer whose sole reactive groups are reactive isocyanate groups. An alternate procedure is to react a polyisocyanate with a molar excess of a polyol, a polyether or a polyester having at least two terminal hydroxyl groups, then cap the resulting reaction product, that is, react it with additional organic polyisocyanate so that the sole reactive groups in the prepolymer are reactive isocyanate groups. By the term polyol or alkylene polyol is meant any hydroxyl containing alkylene compound which has diol, triol or higher hydroxyl functionality and has at least two terminal hydroxyl groups. By the term polyether or oxyalkylene polyol is meant any hydroxyl containing polyether compound having diol, triol or higher hydroxyl functionality and having at least two terminal hydroxyl groups. The polyesters, likewise, should have at least two terminal hydroxyl groups. By an excess of polyisocyanate is meant at least 1.1 isocyanate group for each terminal hydroxyl group. The preferred ratio of equivalents of isocyanate groups to hydroxyl groups in the prepolymer should be about 2:1. The quantity of reactive isocyanate in the prepolymer can also be expressed on a weight basis. Thus, for example, a prepolymer prepared from tolylene diisocyanate and a polyoxyethylene glycol having an average molecular weight of 300 has an isocyanate content of 14.3% by weight. It is clear that as the weight of the polyoxyethylene glycol increases, the weight percent of isocyanate in the prepolymer will decrease. Thus, a prepolymer from tolylene diisocyanate and a polyoxyethylene glycol having an average molecular weight of 3350 will have an isocyanate content of 2.3% by weight. When the prepolymer is the reaction product of a polyol, that is, an alkylene polyol such as trimethylol propane and a polyisocyanate such as tolylene diisocyanate, the prepolymer is customarily described as the reaction product of about one mole of trimethyl propane and about three moles of tolylene diisocyanate and the isocyanate content is not given. Examples of polyol prepolymers include the reaction product of tolylene diisocyanate with trimethylol propane at an NCO/OH ratio of 2:1 (Mondur CB) and the reaction product of tolylene diisocyanate with 1,2,6-hexanetriol at an NCO/OH ratio of 2:1. Such prepolymers are well known and have been used extensively. Likewise, when the prepolymer is the reaction product of a polyester and a polyisocyanate, it is described in terms of the polyester and polyisocyanate and the isocyanate content is not given. Such prepolymers are classified as polyether prepolymers, polyol prepolymers and polyester prepolymers and generally as isocyanate terminated urethane prepolymers or prepolymers because of their extensive use in the art.

Representative polyisocyanates, which can be employed in the production of prepolymers, include tolylene-2,4-diisocyanate,
tolylene-2,6-diisocyanate
tolylene diisocyanate (65% 2,4; 35% 2,6),
tolylene diisocyanate (80% 2,4; 20% 2,6),
1,6-hexamethylenediisocyanate (HDI),
1,4-tetramethylenediisocyanate, hexamethylene diisocyanate,
1,10-decamethylenediisocyanate,
1,5-naphthalenediisocyanate (NDI),
cumene-2,4-diisocyanate,
4-methoxy-1,3-phenylenediisocyanate,
4-chloro-1,3-phenylene-diisocyanate,
4-bromo-1,3-phenylenediisocyanate,
4-ethoxy-1,3-phenylenediisocyanate,
2,4'-diisocyanatodiphenylether,
diphenyl methane-4,4'-diisocyanate (MDI),
5,6-dimethyl-1,3-phenylenediisocyanate,
2,4-dimethyl-1,3-phenylene diisocyanate,
4-isopropyl-1,3-phenylene diisocyanate,
4,4'-diisocyanatodiphenylether,
benzidinediisocyanate,
o-nitrobenzidene diisocyanate,
4,6-dimethyl-1,3-phenylenediisocyanate,
9,10-anthracene-diisocyanate,
4,4'-diisocyanatodibenzyl,
3,3'-dimethyl-4,4'-diisocyanatodiphenylmethane,
2,6-dimethyl-4,4'-diisocyanatodiphenyl,
2-4-diisocyanatostilbene,
4,4'-diphenyl diisocyanate (XDI),
3,3'-dimethyl-4,4'-diphenyl diisocyanate (TODI),
3,3'-dimethoxy-4,4'-diphenyl diisocyanate (DADI),
1,4-anthracenediisocyanate,
mesitylene diisocyanate,
durylene diisocyanate,
2,5-fluorenediisocyanate,
1,8-naphthalenediisocyanate,
2,6-diisocyanatobenzofuran,
2,4,6-toluenetriisocyanate,
tritolylmethane triisocyanate,
2,4,4'-triisocyanatophenyl ether and the like. Another useful isocanate (PAPI-1) has the general formula

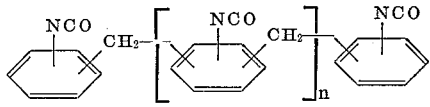

where $n$ has an average value of about 1. 4,4'-methylene bis (cyclohexane isocyanate) can also be used. Mixtures of polyisocyanates may also be used.

Typical examples of isocyanate terminated urethane prepolymers include those formed by reaction of tolylene diisocyanates and polyethers (polyoxyalkylene polyols). Polyethers used in these prepolymers may have average molecular weights of about 136 to 5000 and preferably 600 to 4000 and include, for example, polyoxyethylene glycol having a molecular weight of 1540, polyoxypropylene glycol having a molecular weight of 1025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Polyoxyalkalene glycols containing several different radicals in the molecular chain such as, for example, the compound $$HO(CH_2OC_2H_4O)_nH$$

wherein $n$ is an integer greater than 4 can also be used. For example, polyacetals having hydroxyl groups and molecular weights of about 136 or more can be prepared when an aldehyde and an alcohol such as formaldehyde and ethylene glycol are reacted.

Other polyoxyalkylene polyols, which can be employed in the preparation of the polyether prepolymers, include those prepared by reaction of 1,2-alkylene oxides such as ethylene oxide, propylene oxide, butylene oxide, their mixtures and the like with polyhydroxy compounds such as glycerol, hydroxyl containing glycerides, trimethylolethane, trimethylolpropane, 1,2,6-hexanetriol, pentaerythritol, dipentaerythritol, tripentaerythritol, sorbitol, mannitol and the like, glucosides such as methyl, ethyl, propyl, butyl and 2-ethylhexyl arabinoside, xyloside, fructoside, glucoside, rhammoside and sucrose. For example, an ethylene oxide adduct of glycerol having an average molecular weight of 2000 can be used. A propylene oxide adduct of trimethylolpropane terminated with ethylene oxide to obtain a product with primary hydroxyl groups having an average molecular weight of 4500 can also be employed. Likewise, an ethylene oxide adduct of pentaerythritol having an average molecular weight of 3000 can be used. A propylene oxide adduct of 1,2,6-hexanetriol having an average molecular weight of 1000 can be employed. Polyoxyalkylene polyols obtained by reacting alkylene oxides with mononuclear polyhydroxybenzenes such as resorcinol, pyrogallol, phloroglucinol, hydroquinone, 4,6-di-t-butylcatechol, catechol, orcinol, and other alkylated polyhydroxy benzenes are also useful. Likewise polyoxyalkylene polyols prepared by reacting alkylene oxides with fused ring systems such as 3-hydroxy-2-naphthol, 6,7-dihydroxyl-1-naphthol, 2,5-dihydroxy-1-naphthol, 9,10-dihydroxyanthracene, 2,3-dihydroxyphenanthrene and the like can be used.

Other polyoxyalkylene polyols which can be employed include polyols obtained by reacting 1-2-alkyylene oxides or mixtures thereof with polynuclear phenols such as the various di-, tri- and tetraphenol compounds in which phenols are attached by means of single bonds or by an aliphatic hydrocarbon radical.

Another particularly useful group of polyoxyalkylene polyols are the alkylene oxide adducts of the Novolaks. These products are believed to be mixtures of polynuclear compounds of the diphenylmethane type of structure as 4,4'-dihydroxydiphenylmethane and 2,4'-dihydroxydiphenylmethane formed by the Baeyer reaction of phenol and formaldehyde. In a typical synthesis, Novolaks are prepared by condensing one mole of phenol, such as phenol, cresol or other alkylphenol with 0.8 moles of an aldehyde such as formaldehyde or furfuraldehyde under acidic conditions at temperatures of from 160° C. to 170° C. These polynuclear phenols frequently contain 4 to 8 units and may contain 12 or more units. They are non-curable thermoplastic resins.

Further included are the polyoxyalkylene polyols having nitrogen bridges prepared by reacting one or more of the alkylene oxides described above with ammonia or acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylene pentamine, and the like. A particularly suitable polyoxyalkylene polyol is the propylene oxide addition product of diethylenetriamine represented by the formula:

wherein $n$ represents an integer which provides an average molecular weight or 300 or more.

Other suitable polyoxyalkylene polyols include the 1, 2-alkylene oxide derivatives of mononuclear primary amines such as o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; toluidine; 4,4'-methylenedianiline; 3,3'-dimethyl-4,4'-biphenyldiamine; 3,3'-dichloro-4-4'-biphenylidiamine; 3,3'-dimethyl-4,4'-biphenyldiamine; 4,4'-ethylenedianiline; 4,4'-ethylenedianiline; 1-fluorenamine; 2,5-fluorenediamine, 2,7-fluorenediamine; 1,4-anthradiamine; 3,3'-biphenyldiamine; 3, 4-biphenyldiamine; 9-10-diaminophenanthrene; 4,4'-diaminobenzene and the like.

Higher functional mono- and polynuclear polyamines can also be reacted with 1,2-alkylene oxides to provide useful polyoxyalkylene polyols. These amines include 2,4,6-triaminotoluene, 2,3,5-triaminotoluene; 5,6-diaminoacenaphthalene, 4,4',4'' - methylidynetrianiline, 3,5-diaminobenzoic acid, triaminodiphenyl ethers and sulfides such as 2,4,4' - triaminodiphenyl ether, 2,3',4 - triamino - 4' - methoxydiphenyl ether, the corresponding sulfides and the like; polyamines obtained by interaction of aromatic monoamines with formaldehyde or other aldehydes, for example:

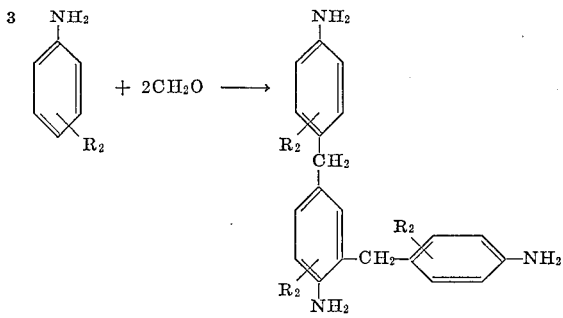

Polyoxyalkylene polyols having sulfur bridges include the condensation products of thioglycol with itself or with other polyhydric alcohols such as ethylene glycol, diethylene glycol, trimethylolpropane and the like. Such polyols can also be condensed with the abovementioned aromatic amines and phenols. Other suitable polycondensation products having sulfur and nitrogen bridges include those obtained by reaction of thioglycol with aromatic amines such as xylidene, toluidines or reaction products of these aromatic amines with alkylene oxides such as ethylene oxide, propylene oxide, butylene oxide, their mixtures and the like.

Polyols, that is alkylene polyols which can be used to form prepolymers include hydroxyl terminated compounds having at least two terminal reactive hydroxyl groups such as ethylene glycol, trimethylolpropane, glycerol, butylene glycols, hexylene glycols, pentaerythritol, dipentaerythritol, tripentaerythritol, sorbitol, carbohydrates, sucrose, other sugars and the like, butanetriols, hexanetriols and the like.

Polyesters, which can be used instead of or in conjunction with alkylene polyols or polyethers (polyoxyalkylene polyols) in preparing isocyanate terminated urethane prepolymers, include, for example, those formed by reacting organic aliphatic, cycloaliphatic or aromatic di- or polycarboxylic acids, or their ester forming derivatives thereof such as anhydrides, acid halides and the like with polyols. These hydroxyl terminated polyesters must have at least two terminal hydroxyl groups. They can also be prepared by known transesterification methods. These polyesters have molecular weights on the order of those of the aforementioned polyoxyalkylene glycols, that is, about 178 to about 5000 and preferably about 600 to about 4000. Acids useful for preparing such polyesters include oxalic, maleic, azelaic, itaconic, citraconic, succinic, adipic, suberic, sebacic, o-phthalic, isophthalic, terephthalic, and hexahydroterephthalic acids, their anhydrides and the alkyl unsaturated and halogen substituted derivatives of these acids as well as their homologues. Other typical acids include hydroxy acids containing from 15 to 20 carbon atoms such as hydroxy palmitic acids, hydroxy stearic acids, ricinoleic acid and the like. Other dibasic acids include dimer acids such as the dimerized unsaturated acids chosen from the octadecadienoic acids preferably from the 9,12-octadecadienoic acid (linoleic acid) to form dilinoleic acids. The dilinoleic acids are prepared by the Diels-Alder reaction. Various fats and oils such as castor oil, soybean oil and the like can also be used. Tribasic acids such as propane tricarboxylic acid, higher alkane tricarboxylic acids, benzene tricarboxylic acids, other aromatic tricarboxylic acids, trimeric acids of $C_{18}$ acids, their anhydrides or the like can be used. Useful polyols for preparing the polyesters include low molecular weight polyols such as ethylene glycol, diethylene gycol, triethylene glycol, 1,4-butylene glycol, 1,6-hexanediol and their mixtures; glycerol, trimethylolethane, trimethylolpropane, 1,2,6-hexanetriol, pentaerythritol, dipentaerythritol, tripentaerythritol, sorbitol, sucrose and the like as well as reaction products of the abovementioned polyols with alkylene oxides such as ethylene oxide, propylene oxide, butylene oxide, their mixtures and the like.

Such polyesters must contain at least two terminal hydroxyl groups. Useful polyesters can be prepared by esterification of from about 2 moles to about 1.02 moles of an alkylene glycol such as ethylene glycol with one mole of a dicarboxylic acid such as oxalic acid. Polyesters having molecular weights of from about 178 to about 5000 are useful in the present invention. When polyols having more than two hydroxyl groups or polycarboxylic acids having more than two carboxylic acid groups are employed, the resulting polyesters will contain more than two terminal hydroxyl groups.

It is to be understood that the polyol, polyether and polyester prepolymers described above must be terminated with unreacted, i.e., free or reactive isocyanate groups for subsequent reaction with the hydroxy ethyl carbamate and that such terminal reactive isocyanate groups are the only reactive groups present in the prepolymer molecule.

II. INTER-REACTION OF HYDROXY ETHYL CARBAMATE WITH PREPOLYMERS

The isocyanate terminated urethane prepolymers described in Section I above can be inter-reacted with hydroxy ethyl carbamate to obtain polyurethane resins for use in the present invention. The prepolymers and hydroxy ethyl carbamate can be inter-reacted in such proportions that all of the reactive, i.e., unreacted or free isocyanate groups in the prepolymer are reacted. When desired, from about 0 to one mole of a hydroxyl terminated compound such as a polyol, a polyether, a polyester, a monohydric alcohol or a monohydric phenol can be reacted with the prepolymer and hydroxy ethyl carbamate provided at least one mole of hydroxy ethyl carbamate and about one mole of prepolymer is present. Further, the reactants should be interreacted in such proportions that a polyurethane resin substantially free of reactive isocyanate groups is obtained.

Suitable hydroxyl terminated compounds include the polyols, polyethers and polyesters having at least two terminal hydroxyl groups described in the preceding section. Further, the compounds may be monohydric compounds such as a monohydric alcohol or phenol. For example, hydrophilic alcohols such as methanol, ethanol, 2-methoxyethanol, isopropanol, 2-diethylaminoethanol or the like can be used. Likewise, hydrophobic alcohols such as octyl alcohol, decyl alcohol or the like can be used. Ethoxylates having a terminal hydroxyl group such as the condensation product of two moles of ethylene oxide with one mole of α-methylbenzylphenol can also be used. Phenols such as phenol, cresols, xylenols, alkylphenols such as amylphenols, octylphenols, diamylphenols, dodecylphenols, dinonylphenols or the like and Mannich condensates derived from phenols can be used.

Such Mannich condensates are the reaction products of (1) a phenol having at least one active hydrogen atom present in the phenol nucleus, (2) at least one aldehyde or aldehyde liberating composition and (3) at least one primary or secondary amine. Suitable amines include alkanolamine such as a monoalkanolamine or dialkanolamine wherein the alkylene groups contain at least two carbon atoms. Mannich condensates are well known and can be prepared by the procedure described in this application as well as by the procedure given in U.S. Patent No. 2,003,092—Bruson, Mar. 3, 1936; U.S. Patent No. 2,114,122—Bruson, Apr. 12, 1938; and U.S. Patent No. 2,220,834—Bruson et al., Nov. 5, 1940.

When phenols that do not contain alkanol groups such as phenol, cresol or the like are reacted with reactive isocyanate groups in organic polyisocyanates, addition products which are blocked or masked isocyanate products are formed. Such blocked isocyanate products have limited thermal stability and are stable up to temperatures of about 150° F. On heating above 150° F., the blocked isocyanate products decompose to regenerate reactive isocyanate groups. The regenerated reactive isocyanate groups then polymerize to form polyurethane resins. It is possible to alkylolate such blocked isocyanate products to obtain polyurethane treating agents within the scope of this invention. Such blocked polyurethane treating agents have the added advantage that they undergo further polymerization via isocyanate polymerization during curing at elevated temperatures. Other active hydrogen compounds such as tertiary butanol, acetone oxime, sodium bisulfite, epsilon caprolactam and the like can be used to prepare blocked or masked polyurethane resins. Such compounds are well known in the art. When desired, an inert solvent such as xylene, dibutyl ether, monochlorobenzene or the like can be used in the reaction.

Since the resulting polyurethane resins are subsequently alkylolated and used in the treatment of substrates, gelling of the polyurethane resins during their preparation, alkylolation and use should be avoided so that the resins and their derivatives have useful viscosities, solubility characteristics, dispersibility characteristics, other physical properties and the like. Gelation of the resins as well as their derivatives should also be avoided because the final products are frequently used in the form of solutions or dispersions particularly aqueous solutions or dispersions for the treatment of substrates. Gelation of the polyurethane treating agent as well as the intermediate polyurethane resin can be controlled by selection of the ratio in which the hydroxyl terminated group present in the hydroxy ethyl carbamate as well as the hydroxyl terminated groups present in any polyols, polyethers, polyesters, monohydric alcohols, monohydric phenols or the like are reacted with the reactive isocyanate groups present in the prepolymer. Generally, to avoid gelation, the ratio of hydroxyl terminated groups to reactive isocyanate groups should be at least 1:1. An excess of hydroxyl terminated groups can be present but an excess is not essential to the present invention. For example, in the case of a difunctional prepolymer, i.e., a prepolymer containing two reactive isocyanate groups available for reaction with hydroxyl terminated groups can be reacted with one hydroxyl terminated group present in the hydroxy ethyl carbamate and with one hydroxyl terminated group present in a hydroxyl terminated compound such as a polyol, polyether, polyester, a monohydric alcohol, a monohydric phenol or the like so that a polyurethane resin substantially free of reactive isocyanate groups is obtained, that is, the percent by weight of reactive isocyanate groups is zero for all practical purposes.

The polyurethane resins can be prepared by inter-reaction of hydroxy ethyl carbamate, isocyanate terminated urethane prepolymer and hydroxyl terminated compound for about 30 minutes to about six hours at a temperature of from about 25° to about 160° C. When desired, an inert solvent can be present. Such reactions are carried out under anhydrous conditions and usually under a nitrogen blanket. The hydroxy ethyl carbamate and hydroxyl terminated compound can be inter-reacted with a prepolymer by the following procedure. The required amount of isocyanate terminated urethane prepolymer is charged into a reactor equipped with agitator and heated to about 40° to about 80° C. The required amounts of hydroxy ethyl carbamate and hydroxyl terminated compound are then heated in a second reactor to about 40° to about 80° C. The heated prepolymer is then slowly added over a period of time from about 15 minutes to about two hours to the heated hydroxy ethyl carbamate and hydroxyl terminated compound in the second reactor while the reaction temperature is maintained at from about 40° to about 80° C. After addition of the prepolymer is complete, the reaction mixture is then heated to about 80° to about 160° C. and maintained at about 80° to about 160° C. for about 30 minutes to about four hours to complete reaction. The resulting product is a polyurethane resin which is substantially free of reactive isocyanate groups. The resin can be used immediately or cooled to room temperature and stored for subsequent use. Optionally, the required amounts of hydroxy ethyl carbamate, hydroxyl terminated compound and prepolymer can be mixed at about 25° C. and inter-reacted at from about 25° to about 160° C. until a polyurethane resin which is substantially free of reactive isocyanate groups is obtained.

III. INTER-REACTION OF HYDROXY ETHYL CARBAMATE WITH POLYISOCYANATES

When desired, the required amounts of hydroxy ethyl carbamate and hydroxyl terminated compound can be inter-reacted with an organic polyisocyanate instead of an isocyanate terminated prepolymer to obtain polyurethane resins useful in the present invention. Any of the polyisocyanates mentioned in Section I can be used. The reaction is carried out under anhydrous conditions at times and temperatures comparable to those used in Section II in the inter-reaction of hydroxy ethyl carbamate and hydroxyl terminated compound with prepolymer. Hydroxyl terminated compounds such as the polyol, polyester, polyether, alcohol, phenol or the like mentioned in Section II can also be used. Useful hydroxyl terminated compounds include the polyols, polyesters and polyethers described in Section I as well as the monohydric alcohols and phenols mentioned in Section II. Likewise, an inert solvent can be used. For example, tolylene diisocyanate can be inter-reacted with hydroxy ethyl carbamate. Likewise, tolylene diisocyanate can be inter-reacted with hydroxy ethyl carbamate and a hydroxyl terminated compound such as 2-diethylaminoethanol. Likewise, DDI, a diisocyanate produced from dimer acids and having a molecular weight of about 600 can be inter-reacted with hydroxy ethyl carbamate to obtain a polyurethane resin useful in the present invention.

A catalyst can be used in preparation of the polyurethane resins described in Sections II and III. Such catalysts are well known and include compounds such as tertiary amines, for example, triethylamine, triethylenediamine, N - methyldicyclohexylamine, dimethylcyclohexylamine, N,N - diethylcyclohexylamine, cyclohexylpiperidine, diethylaniline, N-ethyl morpholine and the like, lead salts such as lead octoate, lead naphthenate and the like, tin salts such as stannous octoate.

IV. ALKYLOLATION OF POLYURETHANE TREATING AGENTS

Polyurethane treating agents are prepared by alkylolation of the polyurethane resins described in Sections II and III above. The polyurethane resins are alkylolated by reaction with from about one to about three moles of an aldehyde or aldehyde liberating compositions per terminal urethane group present in the resin. Alkylolation is effected by reacting the aldehyde or aldehyde liberating composition with the resin in these proportions at about 5° to about 110° C. for about thirty minutes to about ten hours. A solvent such as water, methanol, ethanol, butanol, xylene, their mixtures or the like can be present. The treating agent is usually obtained in the form of a solution or dispersion of the alkylolated polyurethane resin.

Aldehydes or aldehyde liberating compositions which can be used in the alkylolation include aldehydes having one to seven carbon atoms. For example, formaldehyde can be used in the form of 30 to 40% aqueous solutions, 30 to 55% alcohol solutions, with alcohols such as methanol, n-butanol, i-butanol or the like. Formaldehyde can also be used in any of the polymeric forms such as paraformaldehyde, trioxane, hexamethylene tetramine or the like. Other aldehydes such as acetaldehydes, butyraldehyde, heptaldehyde, furfuraldehyde, chloral, alpha-ethyl-beta-propylacrolein, benzaldehyde or the like can be used. Aldehyde compositions such as acetals or the like which will liberate these aldehydes can also be used. Mixtures of these aldehydes can be used.

These polyurethane treating agents are usually used in the form of compositions of the alkylolated polyurethane resins such as solutions or dispersions. For example, the alkylolated polyurethane resins can be reacted with acids to form salts that are soluble or dispersible in water and/or other solvents. These salts can be prepared from inorganic acids such as hydrochloric acid, sulfuric acid, phosphoric acid, nitric acid or the like. They can also be prepared from organic acids containing from one to four carbon atoms such as formic acid, acetic acid, propionic acid, butyric acid, isobutyric acid, succinic acid, maleic acid or the like. These salts are prepared by reacting the acid with the alkylolated polyurethane resin at a temperature of from about 25° to about 110° C. provided these temperatures do not result in decomposition of the reactants or salts. Usually, from about 0 to about one mole of acid is reacted with each reactive tertiary amine group present in the alkylolated polyurethane resin. When desired, all of the reactive tertiary amine groups can be reacted. The salts can be prepared in anhydrous or aqueous systems and solvents can be used. Organic acids which form treating agent salts that disassociate on heating are particularly useful in the preparation of treating agent compositions. When desired, compositions of the alkylolated polyurethane resins or their salts can be formulated with surfactants, epoxides, crosslinking agents, pigments, solvents or the like. Such compositions are useful in specific applications such as padding, brushing, dipping, spraying, coating or the like.

Surfactants such as nonionic surfactants and cationic surfactants can be used in such compositions. From about 0 to 20% by weight of a surfactant based on the weight of alkylolated polyurethane resin can be used. The surfactant aids in the emulsification and/or dispersion of the resin. Useful surfactants include nonionic surfactants obtained from the reaction of alkylene oxides such as ethylene oxide, propylene oxide, butylene oxide, their mixtures and the like with alkylphenols, fatty acids, alcohols and the like and cationic surfactants such as those obtained from the reaction of alkylene oxides with nitrogen containing hydrophobic compounds and those obtained by quaternization of nitrogen containing compounds. Other useful surfactants include the Pluronics, which are block copolymers consisting of polypropylene oxide and polyethylene oxide blocks, have molecular weights of from about 600 to about 100,000 and are polyalkylene glycol ethers. The Tergitol surfactants, which are also polyalkylene glycol ethers and have molecular weights of about 1000 to about 50,000, can also be used. Spans and Tweens such as sorbitan monoleate, sorbitan monolaurate, sorbitan monopalmitate, sorbitan monostearate, sorbitan tristearate, sorbitan trioleate, polyoxyethylene sorbitan monolaurate, polyoxyethylene sorbitan monopalmitate, polyoxyethylene sorbitan monostearate and the like can also be used. Specific products include Span 20, Span 40, Span 60, Span 85, Tween 40, Tween 60 and Tween 80. Anionic surfactants which can be used alone or in conjunction with the abovementioned nonionic surfactants include the sodium and potassium sulfonates of alkylbenzenes, alkylnaphthalenes; sodium and potassium salts of sulfonates or naphthalenes, alkylnaphthalenes, benzenes and alkylbenzenes condensed with formaldehyde; sodium and potassium sulfates of linear and branched alcohols; sodium and potassium sulfates of alkylene oxide condensates of alkylphenols; sodium and potassium sulfates of alkylene oxide condensates of alcohols; alkyl esters of sodium or potassium sulfo succinates or the like. The corresponding phosphonate and phosphate esters particularly the free acids of complex phosphate esters can also be used. Mixtures of the above nonionic and anionic surfactants as well as mixtures of nonionic and anionic surfactants can be used.

When desired, alkylolated polyurethane resins can be formulated with a solvent. Usually, from about 0 to 99% by weight of a solvent based on the weight of alkylolated polyurethane resin is used. The solvent can be present in the resin prior to alkylolation or can be added after alkylolation. Solvents which can be employed in formulating the polyurethane treating agents include water, hydrophilic alcohols such as methanol, ethanol, 2-methoxyethanol, isopropanol and the like, hydrophobic alcohols, such as octyl alcohol, decyl alcohol and the like, chlorinated solvents such as chlorinated ethylenes, chlorinated benzenes and the like, hydrocarbon solvents such as petroleum ether, mineral spirits, benzene, toluene, xylenes, alkylnaphthalenes or the like, ketones such as acetone, methyl ethyl ketone or the like, and esters such as ethyl acetate, amyl acetate, methyl butyrate or the like. Mixtures of solvents can also be used.

Since polyurethane treating agents contain reactive alkylol groups such as methylol groups or the like, they can be formulated or used with crosslinking agents. From about 0 to about one mole of a crosslinking agent per reactive alkylol group present in the alkylolated polyurethane resin can be used. Useful crosslinking agents include phenols, such as phenol, cresol, xylenols other alkylphenols, bis phenols, amino resin bases such as urea, thiourea, dicyandiamide, guanidine, guanylurea, biuret, melamine, ammeline, ammelide, cyanuric acid, guanamine as well as their mixtures, derivatives and the like. Likewise, compounds having reactive amino groups such as primary amines, ammonia, polyamines, e.g., diethylenetriamine or the like can be used. Further, the reactive alkylol groups present in the treating agents can also be reacted with reactive groups such as hydroxyl or amine groups present in the substrate.

The alkyloated polyurethane treating agents disclosed in this invention are useful in the treatment of fibrous materials such as textiles, plastics, leather, paper and the like. These agents can be used to treat textile materials such as fibers, fabrics and the like. Useful textile materials include those derived from natural, man-made and synthetic fibers such as cotton, wool, silk, jute, sisal, hemp, fur, flax, kapok, rayon, cellulose acetate, cellulose triacetate, polyamides such as nylon, polyesters such as polyethylene terephthalate (Dacron), acrylics such as polyacrylonitrile, vinyl resins such as copolymers or polyvinyl chloride and polyvinyl acetate, copolymers of vinylidene chloride and vinyl chloride, copolymers of acrylonitrile and vinyl chloride or the like, polystyrene, polyethylene, polypropylene, polyurethane, glass, ceramic, asbestos, protein fibers such as vicara and peanut protein blends of these or the like. Blends of these fibers can also be used.

These treating agents can be applied to the textile material by any of the procedures and equipment used in coating or treating fibrous materials, including spraying, padding, dipping, brushing, knife and doctor blades, air blades, roller coatings, curtain coatings, gravure coatings and the like. The agents can be applied in concentrated forms or in dilute forms such as solutions, emulsions and the like depending on the type of application. When the agents are applied in dilute form, the treated material is dried at about 30° F. up to about 300° F. The quantity of treating agent used may vary from about 0.01% by weight to about 3.0% by weight based on the weight of the dry fiber. Generally, from about 0.1% by weight to about 1.0 by weight based on the weight of dry fiber can be used. If desired, other additives such as stabilizers, antioxidants, thickeners, softeners, lubricants and the like can be formulated with the treating agent provided such additives are compatible with the treating agents which are cationic materials, that is, such additives do not interreact with the agents to form gels, precipitates or the like. The treating agents are particularly useful in the treatment of textiles materials to improve their antistatic properties and the like. Further, the agents are useful in improving other fiber properties such as lubricity, handle, drape, softness, dyeability, pigment binding, fullness, abrasion resistance, finish, other desirable textile properties and the like.

When the alkyloated polyurethane treating agents of the present invention are used in the coloration and pigmentation of textile materials such as fibers or fabrics, they can be applied by one of the methods described above such as padding, spraying or the like. The amount of treating agent which is applied to the fiber will depend on the properties of the fiber as well as the particular application in which the treating agent is being used. If desired, the treating agent can be applied to the fiber in a colorless form, i.e., a form of the agent which is free of pigment or dye, cured and subsequently tinted or dyed. The temperature at which the treating agent is applied is not critical and is usually in the range of from about 20° to about 100° F.

After the treating agent is applied as a coating on fiber or fabric, the coated fiber or fabric is dried at about 30° to about 300° F. and then cured by passage through a curing oven maintained at a temperature of from about 200° to about 450° F. preferably from about 225° to about 425° F. The residence time in the curing oven can vary from about one to about one hundred and twenty minutes and preferably from about two to about five minutes. The optimum temperature and residence time in the curing oven can readily be determined by placing dried uncured samples of the coated fiber or fabric in the oven and heating the samples for given periods of time to determine when satisfactory curing of the coating on the samples occurs. From about 0.1% to about 30% of the cured treating agent based on the weight of the fiber can be used. Usually concentrations of about 1 to about 15% by weight of the cured treating agent based on the weight of the fiber are preferred.

When treating agents are employed as pigment binders, the pigment can be dispersed in an aqueous solution or aqueous dispersion of the treating agent and the resulting composition is applied to the fiber or fabric, dried and cured in the manner described above. The treating agents disclosed in this invention can be used to bind pigments such as C.I. RB 10 carbon black, C.I. RB 31 iron oxide red, C.I.RB 40 phthalocyanine green, C.I. RB 51 chrome orange, C.I. RB 54 molybdate orange, C.I RB 81 titanium dioxide, C.I. RB 98 cadimum yellow and the like. Other types of pigments can also be used. The concentration of pigment in the treating agent used in this application will vary depending on the amount of pigmentation desired and the type of coating. The concentration of pigment can vary from about 0.01% to about 40% based on the weight of the alkylolated polyurethane resin present in the treating agent.

If desired, a treating agent, which is free of pigment, that is, containing 0% by weight based on the weight of the alkylolated polyurethane resin, can be used to form colorless coatings on fibers or fabrics. These colorless coatings are dried, cured in the manner described above and then dyed by conventional methods. Acid dyes such as C.I. Acid Fellow 40 C.I. 18950 (Fast Fellow 2GC), C.I. Acid Yellow 116 (Cibalan Yellow GRL), C.I. Acid Yellow 118 (Vialon Fast Yellow G), C.I. Acid Red 114 (Benzyl Red BR), C.I. Acid Red 225 (Vialon Fast Red B), C.I. Acid Red 251 (Cibalan Bordeaux EL), C.I. Acid Blue 170 (Cibalan Blue BRL), C.I. Acid Blue 209 (Vialon Fast Blue FFG), C.I. Acid Black 61 (Vialon Fast Blue Grey B) and the like can be used to dye colorless coatings. The concentration of dye used will depend upon the particular strength and shade desired. The concentration of dye can vary from about 0.01% to about 5% based on the weight of fiber with the preferred concentrations being from about 0.01% to about 4% based on the weight of fiber. The concentrations of treating agent which is employed as a colorless coating on fiber or fabric will be in the same range as those used above for pigment binding.

The treating agents can also be formulated with epoxides to improve properties such as hand, coating, bonding, adhesion and the like. From about 0 to about one mole of an epoxide having at least eight carbon atoms can be added for each reactive hydrogen atom present in the alkylolated polyurethane resin. Useful epoxides include an epoxide of soya bean oil, linseed oil, triglycerides of epoxidized fatty acids such as oleic, linolenic, myristoleic, palmitoleic, eleostearic and arachidonic acids, 1,2-epoxy dodecane, 4,5-epoxy eicosanes such as di-(isodecyl)-4,5-epoxide and the like. Other epoxides include Unox Epoxide 221 which is 3,4-epoxycyclohexylmethyl 3,4-epoxycyclohexanecarboxylate and Epon Resin 828 which is the diepoxide of the diglycidyl derivative of 4,4'-dihydroxydiphenyl-dimethyl methane or the like. These epoxide compositions are particularly useful in improving desirable properties such as hand, washfastness and the like when the compositions are applied to natural fibers, glass fibers, synthetic fibers or the like and cured. The epoxide compositions are also useful as adhesives and sealants for bonding fabric-to-fabric, plastic-to-plastic, wood-to-wood, wool-to-metal, metal-to-metal and other substrates. Further, such compositions can be used as coatings, e.g., varnishes, lacquers or the like to coat any of the above-mentioned substrates. Such coating compositions can contain the above polyurethane treating agents. Further, the agents may be used in either their cured or uncured forms. Coatings obtained with these treating agents are characterized by excellent abrasion resistance, durability and the like.

If desired, metal salts such as basic aluminum acetate, zirconium acetate, Werner-type reactive chromium complexes, e.g., Quilon or the like which decompose on heating to form mordants can be mixed with treating agents. Such complexes include stearate chromic chloride and other complex compounds such as those described in United States Patent No. 2,273,040, granted Feb. 17, 1942. These mixtures can be applied to fabrics or fibers, dried and cured to form coatings which contain mordants. The presence of these mordants in the cured coatings greatly facilitates dyeing with dyestuffs such as acid dyestuffs and the like. These complexes can be applied from aqueous solutions in concentrations of from about 1% to about 5% by weight based on the weight of fiber with the preferred concentration being about 2% to about 4% based on the weight of fiber.

These treating agents are also useful in improving antistatic properties and abrasion resistance of fibers and fabrics. The treating agents are applied as coatings to fibers and fabrics, dried and cured in the same manner as the pigment binding and dyeing applications described above. Fibers and fabrics treated with these treating agents exhibit improved antistatic properties.

These treating agents can also be used as bond coatings and tie bond coatings on fiber glass. The treating agents are applied, dried and cured by the procedures described above. When the treating agents are used for bond coatings on fiber glass, the cured coating of treating agent on the fiber glass is dip coated with a resorcinol formaldehyde coating and then molded with rubber to produce a rubber to fiber glass bond. When the treating agents are used as tie bond coatings for fiber glass roving, a coating of treating agent is applied to the fiber glass and cured to form a tie bond coating. A polyester coating is then applied to the tie bond coating on the fiber and cured with a free radical catalyst.

These treating agents are also useful in the finishing of leather. They may be used to impregnate or coat leather. The treating agents can be used in the form of compositions containing about 0.1% to about 30% by weight of the treating agent based on the weight of leather and can be prepared by diluting the treating agent with a solvent such as alcohol or alcohol and water mixtures. Such compositions of the treating agents are used to impregnate, coat and condition leather which has previously been fat-liquored. Excellent penetration of the leather is obtained with these compositions and there is no evidence of tackiness after the treated leather has been dried. The compositions can be applied to leather as spray coatings, curtain coatings or by drum applications. Chrome tanned leather as well as vegetable tanned leather can be treated with these agents.

The polyurethane treating agents can also be used in paper making. They can be added directly to the beater in paper making and the alkalinity of the pulp and the beater raised so that the treating agent condenses with the hydroxyl group present in the cellulose. Paper prepared by the processes described above has increased strength and water resistance. Thus, the treating agents and the above compositions such as those containing crosslinking agents, solvents can be used to coat paper to improve properties such as water resistance and the like.

For a fuller understanding of the nature and objects of this invention, reference may be made to the following examples which are given merely to illustrate the invention and are not to be construed in a limiting sense. All weights, proportions and percentages are by weight unless otherwise indicated. Likewise, all references to temperature are ° C. unless otherwise indicated.

EXAMPLE I (A) Preparation of an isocyanate terminated urethane prepolymer 1572.9 g. of Pluracol TP–1540 i.e., a triol, which is a propylene oxide adduct of trimethylolpropane having average molecular weight of about 1540 and a hydroxyl number of 107, was charged into a glass flask equipped with an agitator and reflux condenser. The flask also had external heating and cooling facilities as well as provisions for maintaining a nitrogen blanket over the reactants to provide anhydrous conditions during reaction. The triol was anhydrous and was charged into the flask under anhydrous conditions and under a nitrogen blanket. 522 g. of tolylene diisocyanate was then added over about fifteen minutes to the triol. The resulting reaction mixture was then reacted under anhydrous conditions and under a nitrogen blanket. Then the reaction mixture was heated with agitation to about 75° C. and agitated at about 70° C. to about 75° C. for about one hour to complete reaction. The reaction mixtures was then cooled to below 50° C. and analyzed. The resulting reaction product was an isocyanate terminated urethane prepolymer having a reactive isocyanate content of about 5.9% by weight.

(B) Preparation of a polyurethane treating agent 61.69 g. of the isocyanate terminated urethane prepolymer obtained in part (A) above was charged into a glass flask equipped with agitator and reflux condenser. 6.26 g. of hydroxy ethyl carbamate was then charged under anhydrous conditions and under a nitrogen blanket. Then the reaction mixture was stirred for about fifteen minutes and 3.48 g. of 2-diethylamino-ethanol was charged with agitation over fifteen minutes. An exothermic reaction occurred after the ethanol addition and the reaction temperature rose to about 65° C. The reaction mixture was heated to about 75° C. over forty-five minutes and then heated at about 75° C. to about 80° C. for one hour. Then the reaction mixture was heated to 85° C. and reaction was completed by heating the reaction mixture at about 85° C. to about 90° C. for an additional thirty minutes. The resulting reaction product was a polyurethane resin which was substantially free of reactive isocyanate groups.

The polyurethane resin was then cooled to about 65° C. and 14.55 g. of a 37% by weight aqueous formaldehyde solution was added over 20 to 25 minutes. The formaldehyde solution contained 0.13 g. of a 20% by weight aqueous sodium hydroxide solution. The resin and formaldehyde were reacted at about 60° C. to about 65° C. for about 1.5 hours. 12.10 g. of isopropanol was then added and the mixture was agitated until uniform. The resulting mixture was then cooled to below 40° C. and 1.79 g. of glacial acetic acid was added over about fifteen minutes. The resulting reaction product, which was a methylolated polyurethane resin, was the desired treating agent.

EXAMPLE II (A) Preparation of a polyurethane resin 174 g. of tolylene diisocyanate was introduced into a glass flask equipped with agitator and reflux condenser. The flask also had external heating and cooling facilities as well as provisions for maintaining a nitrogen blanket over the reactants to provide anhydrous conditions during reaction. The tolylene diisocyanate was anhydrous and was charged into the flask under anhydrous conditions and under a nitrogen blanket. 210 g. of hydroxy ethyl carbamate was then added quickly to the tolylene diisocyanate charge. An exothermic reaction occurred. When the reaction temperature reached about 60° C., the reaction mixture was cooled externally under conditions which permitted the reaction temperature to rise to about 90° C. Reactions was completed by holding the reaction mixture at about 90° C. to about 100° C. for one hour. The resulting reaction product was a polyurethane resin which was the reaction product of tolylene diisocyanate and hydroxy ethyl carbamate.

(B) Preparation of a polyurethane treating agent

The polyurethane resin obtained in part (A) above was cooled from about 90° C. to about 70° C. and 326 g. of an aqueous formaldehyde solution containing 37% by weight of formaldehyde was added. The formaldehyde solution had a pH of from about 9.5 and had been adjusted to this pH by addition of a 2% by weight aqueous sodium hydroxide solution. 110 g. of a 55% by weight solution of formaldehyde in methanol was then added. The resulting reaction mixture was then heated with agitation to about 70° C. and reacted at about 70° C. to about 80° C. for one hour to methylolate the polyurethane resin. During methylolation of the resin, the pH of the reaction mixture was maintained at a pH between about 9.0 and about 9.7 by the addition of additional 2% by weight aqueous sodium hydroxide solution. A total of 85 g. of 2% sodium aqueous hydroxide solution was required to maintain the pH within this range during methylolation of the resin. The resulting reaction product was a polyurethane treating agent in the form of an aqueous solution of a methylolated polyurethane resin. The treating agent was water soluble and could be diluted with water without precipitation.

EXAMPLE III (A) Preparation of an isocyanate terminated urethane prepolymer 750.8 g. of Pluracol TP–1540 i.e., a triol, which is a propylene oxide adduct of trimethylolpropane having an average molecular weight of about 1540 and a hydroxyl number of about 107, was charged into a glass flask equipped with stirrer and reflux condenser. The flask was also equipped with external heating and cooling facilities as well as provisions for maintaining a nitrogen blanket over the reactants to provide anhydrous conditions during reaction. The triol was anhydrous and was charged into the flask under anhydrous conditions and under a nitrogen blanket. 249.2 g. of tolylene diisocyanate was then added to the triol over about fifteen minutes. The proportions of reactants used in the prepolymer were one mole of triol and three moles of diisocyanate. The reaction mixture was then heated with agitation to about 75° C., agitated at about 70° C. to about 75° C. for about one hour to complete reaction and then cooled to room temperature. The resulting reaction product was an isocyanate terminated urethane prepolymer having an isocyanate content of about 5.9% by weight.

(B) Preparation of a polyurethane resin 355 g. of the isocyanate terminated urethane prepolymer obtained in part (A) above, 44 g. of xylene, 35 g. of hydroxy ethyl carbamate and 51 g. of a Mannich condensate prepared by the procedure described below were mixed with vigorous agitation. The proportions of the reactants in the resin were one mole of prepolymer, two moles of hydroxy ethyl carbamate and one mole of Mannich condensate. The resulting reaction mixture was then heated to about 75° C. and reacted by agitating the mixture at a temperature of about 75° C. to about 80° C. for 1.5 hours under a nitrogen blanket. A catalyst containing 0.1 g. of stannous octoate in 2.0 g. of xylene was added and reaction was completed by agitating at about 70° C. to about 75° C. for one hour. The resulting reaction product was a polyxurethane resin dissolved in xylene.

The Mannich condensate used in the above resin preparation was prepared by dissolving 375 g. of N-methyl ethanolamine in 100 g. of methanol and cooling the resulting amine solution to about 10° C. 407.5 g. of an aqueous formaldehyde solution containing 37% by weight of formaldehyde were charged over about two hours at a temperature below about 15° C. to the amine solution. A mixture of 1100 g. of nonylphenol and 50 g. of methanol was added rapidly with vigorous agitation to the amine solution and then 500 g. of methanol added at a temperature below 20° C. to obtain a clear solution. The proportions of the reactants used in the Mannich condensate were one mole of amine, one mole of formaldehyde and one mole nonylphenol. The reaction mixture was then agitated at below 20° C. for one hour, heated with agitation to about 65° C. and agitated at about 65° C. for about two hours to complete reaction. The resulting reaction product which was the desired Mannich condensate was vacuum distilled to remove water, methanol and other volatile materials. Vacuum distillation was continued until a pot temperature of 100° C. was reached and the moisture content of the condensate was less than 0.2% by weight.

(C) Preparation of a polyurethane treating agent

To 485 g. of the polyurethane resin obtained in part (B) above was added 81.5 g. of an aqueous formaldehyde solution containing 37% by weight of formaldehyde and 4.0 g. of 20% by weight aqueous sodium hydroxide solution. A total of six moles of formaldehyde were condensed with one mole of the resin. The resulting reaction mixture was then heated with agitation to about 60° C. and reacted at about 60° to about 65° C. for three hours to methylolate the polyurethane resin. 1.2 g. of glacial acetic acid was added to the resulting reaction product and the product was stirred to obtain a uniform aqueous mixture of the treating agent which was a methylolated polyurethane resin.

EXAMPLE IV (A) Preparation of a polyurethane resin 826 g. of the isocyanate terminated urethane prepolymer obtained in part (A) of Example III and 84 g. of hydroxy ethyl carbamate were agitated under anhydrous conditions at room temperature. 46.8 g. of 2-diethylaminoethanol was then added to the reaction mixture under a nitrogen blanket and under anhydrous conditions. The resulting reaction mixture was then heated to about 75° C. and reacted by agitating the mixture at a temperaure of about 75° C. to about 80° C. for one hour. The reaction mixture was then heated at about 85° C. and reacted at about 85° C. to about 90° C. for an additional thirty minutes to complete reaction. The resulting reaction product was a polyurethane resin.

(B) Preparation of a polyurethane treating agent

To 956.8 g. of the polyurethane resin obtained in part (A) above was added 81.5 g. of an aqueous formaldehyde solution containing 37% by weight of formaldehyde. The proportions of reactants used in the agent were one mole of prepolymer, two moles of carbamate, one mole of amine and 2.5 moles of formaldehyde. The resulting reaction mixture was then heated with agitation to about 60° C. and reacted at about 60° to about 65° C. for 1.5 hours to methylolate the polyurethane resin. The resulting reaction product which was a methylolated polyurethane resin was then cooled to about 40° C. and 24 g. of glacial acetic acid added. 233 g. of isopropanol (99% by weight) was then added to the resulting reaction product with agitation to obtain the desired alkylolated polyurethane treating agent.

EXAMPLE V (A) Preparation of a polyurethane resin

To 355.8 g. of the isocyanate terminated urethane prepolymer obtained in part (A) of Example III above cooled to a temperature of about 50° C., 52.5 g. of hydroxy ethyl carbamate and 81.6 g. of xylene containing 0.2 g. of stannous octoate as a catalyst were added with vigorous agitation under anhydrous conditions and under a nitrogen blanket. The resulting reaction mixture was then heated to about 70° C. and reaction was completed by agitating the mixture at a temperature of from about 70° C. to about 75° C. for one hour and then for an additional 1.5 hours at about 100° C. to about 105° C. The resulting reaction product was a polyurethane resin.

(B) Preparation of a polyurethane treating agent

To 489.9 g. of the polyurethane resin obtained in part (A) above cooled to about 70° C. was added 95.2 g. of an aqueous formaldehyde solution containing 37% by weight of formaldehyde and 4.7 g. of 20% by weight aqueous sodium hydroxide solution. The proportions of reactants used in the treating agent were one mole of prepolymer, three moles of carbamate and seven moles of formaldehyde. The resulting reaction mixture was then heated with agitation to about 60° C. and reacted at about 60° to 65° C. for four hours to methylolate the polyurethane resin. The reaction product, which was a methylolated polyurethane resin, was cooled to about 40° C. and 1.41 g. of glacial acetic acid was added. The resulting polyurethane treating agent was then agitated until uniform.

EXAMPLE VI (A) Preparation of a polyurethane resin

To 616.9 g. of the isocyanate terminated urethane prepolymer obtained in part (A) of Example III above was added 62.6 g. of hydroxy ethyl carbamate at room temperature with vigorous agitation under anhydrous conditions and under a nitrogen blanket. The resulting reaction mixture was agitated for 15 minutes. 34.8 g. of 2-diethylaminoethanol was then added with agitation over a 15 minute period. An exothermic reaction occurred and the reaction temperature rose to about 65° C. The reaction mixture was then heated to about 75° C. and reaction was completed by heating the mixture with agitation to about 75° C. over forty-five minutes, heating with agitation for one hour at about 75° to about 80° C., then heating to about 85° C. and agitating the mixture at about 85° to about 90° C. for an additional thirty minutes. The resulting reaction product was a polyurethane resin.

(B) Preparation of a polyurethane treating agent

To 714.3 g. of the polyurethane resin obtained in part (A) above was added 145.5 g. of an aqueous formaldehyde solution containing 37% by weight of formaldehyde and 1.3 g. of 20% by weight aqueous sodium hydroxide solution. The proportions of reactants used in the agent were one mole of prepolymer, two moles of carbamate, one mole of amine and six moles of formaldehyde. The resulting reaction mixture was then heated with agitation to about 60° C. and reacted at about 60° to 65° C. for 1.5 hours to methylolate the polyurethane resin. The reaction product which was a methylolated polyurethane resin was then diluted with 121.0 g. isopropanol and the resulting mixture was agitated until uniform. The mixture was then cooled to 40° C. and 17.9 g. of glacial acetic acid added with agitation to obtain the desired polyurethane treating agent.

EXAMPLE VII (A) Preparation of an isocyanate terminated urethane prepolymer 989.2 g. of a triol which was Pluracol TP–740, a propylene oxide adduct of trimethylolpropane having an average molecular weight of about 740 and a hydroxyl number of about 226.8 was charged into a glass flask equipped with agitator and reflux condenser. The flask also had external heating and cooling facilities as well as provisions for maintaining a nitrogen blanket over the reactants to provide anhydrous conditions during reaction. The anhydrous triol was charged into the flask under anhydrous conditions and under a nitrogen blanket. 696 g. of tolylene diisocyanate was then added to the triol over about 15 minutes. The proportions of reactants used in the prepolymer were one mole of triol and three moles of diisocyanate. The reaction mixture was then heated with agitation to about 65° C. and was then reacted with agitation at about 75° C. to about 80° C. for about one hour to complete reaction. The resulting reaction product was an isocyanate terminated urethane prepolymer having an isocyanate content of about 9.53% by weight.

(B) Preparation of a polyurethane resin

To 661 g. of the isocyanate terminated urethane prepolymer obtained in part (A) above cooled to a temperature of about 50° C., 81.8 g. of xylene and 157.5 g. hydroxy ethyl carbamate were added with vigorous agitation. 0.4 g. of stanous octoate dissolved in 5.0 g. of xylene was then added as a catalyst. The resulting reaction mixture was then heated to about 70° C. and the temperature gradually raised to 90° C. Reaction was completed by heating the reaction mixture with agitation at about 90° C. to about 95° C. for 3.5 hours. The resulting reaction product was a polyurethane resin which was substantially free of reactive isocyanate groups.

(C) Preparation of a polyurethane treating agent

To 905.3 g. of the polyurethane resin obtained in part (B) above was added 285.2 g. of an aqueous formaldehyde solution containing 37% by weight of formaldehyde and 14.0 g. of 20% sodium hydroxide solution. The proportions of reactants used in the treating agent were one mole of prepolymer, three moles of carbamate and seven moles of formaldehyde. The resulting reaction mixture was then heated with agitation to about 60° to 65° C. and reacted at about 60° to 65° C. for one hour to methylolate the polyurethane resin. 4.2 g. of glacial acetic acid was then mixed with the methylolated polyurethane resin to obtain an organic salt of the treating agent.

EXAMPLE VIII (A) Preparation of a polyurethane resin

To 483.5 g. of the isocyanate terminated urethane prepolymer obtained in part (A) of Example VII above at room temperature, 48.3 g. of anhydrous xylene was added with agitation under anhydrous conditions and under a nitrogen blanket. 103.7 g. of an alcohol which was an ethoxylation product obtained by condensing two moles of ethylene oxide with one mole of α-methylbenzylphenol and 80.7 g. of hydroxy ethyl carbamate were then added with vigorous agitation. Then 0.33 g. of stannous octoate dissolved in 3.0 g. of xylene was added as a catalyst. The resulting reaction mixture was then heated to about 80° C. with agitation. Reaction was completed by agitating the mixture at about 80° C. to about 95° C. for five hours. The resulting reaction product was a polyurethane resin.

(B) Preparation of a polyurethane treating agent

To 716.2 g. of the polyurethane resin obtained in part (A) above was added 178.9 g. of an aqueous formaldehyde solution containing 37% by weight of formaldehyde and 8.8 g. of 20% by weight sodium hydroxide solution. The proportions of reactants used in the agent were one mole of prepolymer, 0.9 mole of alcohol (ethoxylation product), 2.1 mole of carbamate and 6.0 moles of formaldehyde. The resulting reaction mixture was then heated with agitation to about 65° C. and reacted at about 65° C. to 75° C. for three hours to methylolate the polyurethane resin. The reaction product was then cooled to room temperature and mixed with 2.6 g. of glacial acetic acid to obtain a uniform mixture of the methylolated polyurethane resin which was the desired treating agent.

EXAMPLE IX (A) Preparation of an isocyanate terminated urethane prepolymer 566.4 g. of a triol, Pluracol TP–440 which was a condensate of propylene oxide with trimethylolpropane having an average molecular weight of about 440 and a hydroxyl number of 396 was charged into a glass flask equipped with stirrer and reflux condenser. The flask was also equipped with external heating and cooling facilities as well as provisions for maintaining a nitrogen blanket over the reactants to provide anhydrous conditions during reaction. The anhydrous triol was charged into the flask under anhydrous conditions and under a nitrogen blanket. 315.6 g. of anhydrous xylene was then charged to the flask. 696.0 g. of tolylene diisocyanate was then added to the triol and xylene in the flask. The proportions of reactants used in the prepolymer were one mole of triol and three moles of diisocyanate. The resulting reaction mixture was then heated with agitation to about 75° C. and thereafter agitated at about 75° C. to about 80° C. for about one hour to complete reaction. The resulting reaction product was an isocyanate terminated urethane prepolymer having an isocyanate content of 10.3% by weight.

(B) Preparation of a polyurethane resin

To 617.3 g. of the isocyanate terminated urethane prepolymer obtained in part (A) above cooled to a temperature of about 50° C., 116 g., of xylene containing 0.39 g. of stannous octoate was added as a catalyst. 157.5 g. of hydroxy ethyl carbamate was then added with vigorous agitation under anhydrous conditions and under a nitrogen atmosphere. The resulting reaction mixture was then heated to about 100° C. and reaction was completed by agitating the mixture at a temperature of about 100° C. to about 110° C. for two hours. The reaction product was a polyurethane resin.

(C) Preparation of a polyurethane treating agent

To 890.8 g. of the polyurethane resin obtained in part (B) above was added 285.2 g. of an aqueous formaldehyde solution containing 37% by weight of formaldehyde and 14.0 g. of a 20% by weight sodium hydroxide solution. The proportions of reactants used in the agent were one mole of prepolymer, three moles of carbamate and seven moles of formaldehyde. The resulting reaction mixture was then heated with agitation to about 65° C. and reacted at about 65° to 70° C. for three hours to methylolate the polyurethane resin. 4.2 g. of glacial acetic acid was added with agitation to the methylolated polyurethane resin. 65 g. of xylene was then separated from the reaction product after standing. The resulting mixture was the desired polyurethane treating agent.

EXAMPLE X (A) Preparation of a polyurethane resin

To 401 g. of the isocyanate terminated urethane prepolymer obtained in part (A) of Example IX above cooled to room temperature, 70 g. of hydroxy ethyl carbamate was added with vigorous agitation. The resulting mixture was stirred for ten minutes and 39 g. of 2-diethylethanolamine was added. An exothermic reaction occurred and the reaction mixture was cooled to moderate the reaction. Reaction was completed by agitating the mixture at about 75° C. to about 80° C. for one hour. The reaction product was a polyurethane resin.

(B) Preparation of a polyurethane treating agent

To 510 g. of the polyurethane resin obtained in part (A) above was added 163 g. of an aqueous formaldehyde solution containing 37% by weight of formaldehyde and 1.47 g. of a 20% by weight aqueous sodium hydroxide solution. The proportions of reactants used in the treating agent were one mole of prepolymer, two moles of carbamate, one mole of amine and six moles of formaldehyde. The resulting reaction mixture was then heated with agitation to about 60° C. and reacted at about 65° C. for two hours to methylolate the polyurethane resin. 20.0 g. of glacial acetic acid was added to the methylolated polyurethane resin. The resulting mixture was stirred until uniform to obtain a polyurethane treating agent containing 73.7% by weight solids.

EXAMPLE XI (A) Preparation of an isocyanate terminated urethane prepolymer 770 g. of a polyethylene glycol having an average molecular weight of about 1540 was melted and charged into a glass flask equipped with agitator and reflux condenser. The flask was also equipped with external heating and cooling facilities as well as provisions for maintaining a nitrogen blanket over the reactants to provide anhydrous conditions during reaction. The polyethylene glycol was in anhydrous form and was charged into the flask under anhydrous conditions. The polyethylene glycol charge was then cooled to about 50° C. under anhydrous conditions and under a nitrogen blanket. 174 g. of tolylene diisocyanate was then added to the melted glycol over about 15 minutes. The resulting reaction mixture was then heated with agitation to about 75° C. and agitated at about 75° to about 80° C. for about 1.5 hours to complete reaction. The resulting reaction product was an isocyanate terminated urethane prepolymer having an isocyanate content of 4.0% by weight.

(B) Preparation of a polyurethane resin

To 944 g. of the isocyanate terminated urethane prepolymer obtained in part (A) above cooled to a temperature of about 50° C., 105 g. of hydroxy ethyl carbamate was added with vigorous agitation. The resulting reaction mixture was then heated to about 75° C. and reaction was completed by agitating the mixture at about 75° to 80° C. for 1.5 hours. Analysis showed that the reaction product was a polyurethane resin which did not contain reactive isocyanate groups and had an isocyanate content of 0.0% by weight.

(C) Preparation of a polyurethane treating agent

To 1049 g. of the polyurethane resin obtained in part (B) above was added 244.5 g. of an aqueous formaldehyde solution containing 37% by weight of formaldehyde and having a pH of from about 9.0 to about 9.7. The pH of the formaldehyde solution had been adjusted to this pH range by addition of 2% by weight aqueous sodium hydroxide solution. The resulting reaction mixture was then heated with agitation to about 60° C. and reacted with agitation at about 60° C. to 65° C. for two hours to methylolate the polyurethane resin. During methylolation of the resin, the pH of the reaction mixture was maintained at a pH between about 9.0 and about 9.7 by the addition of 2% by weight aqueous sodium hydroxide solution. A total of 161 g. of 2% aqueous sodium hydroxide solution was required to maintain the pH within this range during methylolation of the resin. The resulting reaction product was a polyurethane treating agent which was an aqueous solution of a methylolated polyurethane resin.

EXAMPLE XII (A) Preparation of a polyurethane resin 42.0 g. hydroxy ethyl carbamate, 142.0 g. of xylene and 120.0 g. of diisocyanate 1410, DDI having a molecular weight of 600 were charged into a glass flask equipped with agitator and reflux condenser. A molar ratio of two moles of carbamate to one mole of diisocyanate was used. The flask was also equipped with external heating and cooling facilities as well as provisions for maintaining a nitrogen blanket over the reactants to provide anhydrous conditions during reaction. The reactants were in anhydrous form and were charged into the flask under anhydrous conditions and under a nitrogen blanket. After the reaction mixture had been stirred for ten minutes, 0.08 g. of stannous octoate dissolved in 20 g. of xylene was added as a catalyst. The resulting reaction mixture was then heated with agitation over one hour to about 70° C. to about 75° C. and the temperature was gradually raised to about 80° C. The mixture was thereafter reacted at about 80° to about 85° C. for seven hours to obtain a polyurethane resin having a reactive isocyanate content of about 0.0% by weight.

(B) Preparation of a polyurethane treating agent

To 324.0 g. of the polyurethane resin obtained in part (A) above was added 44.2 g. of a formaldehyde solution containing 55% by weight of formaldehyde dissolved in methanol and 3.24 g. of a 20% by weight aqueous sodium hydroxide solution. The resulting reaction mixture was then heated with agitation to about 60° to 65° C. and reacted at about 60° to 65° C. for three hours to methylolate the polyurethane resin. 1.0 g. of glacial acetic acid was then added with agitation to the reaction product to obtain a polyurethane treating agent containing 50% by weight solids.

EXAMPLE XIII (A) Preparation of a polyurethane resin

To 638.0 g. of the isocyanate terminated urethane prepolymer obtained in part (A) of Example III at room temperature was added 146.3 g. of xylene and 63 g. of hydroxy ethyl carbamate. The resulting reaction mixture was agitated for ten minutes. 28.2 g. of molten phenol was added over about five minutes and the mixture stirred for about ten minutes. 0.47 g. of diethylaniline dissolved in 3.0 g. of xylene was then added as a catalyst. The reaction mixture was then heated to about 70° C., reacted at about 70° to about 75° C. for 2.75 hours, then gradually heated to about 100° C. and reacted at about 100° C. to about 105° C. for 2.5 hours to obtain a polyurethane resin. The resin was cooled to about 60° C.

(B) Preparation of a polyurethane treating agent

To the polyurethane resin obtained in part (A) above was added 97.7 g. of an aqueous formaldehyde solution containing 37% by weight of formaldehyde and 4.84 g. of a 20% by weight sodium hydroxide solution. The proportions of reactants used in the agent were one mole of prepolymer, two moles of carbamate, one mole of phenol and four moles of formaldehyde. The resulting reaction mixture was then heated with agitation to about 55° C. and reacted at about 55° to 60° for 2.5 hours to methylolate the polyurethane resin. 1.45 g. of glacial acetic acid was then added to the reaction product and the mixture agitated until uniform. The resulting mixture was a treating agent containing 78.0% by weight solids.

EXAMPLE XIV

(A) Preparation of an isocyanate terminated urethane prepolymer 720 g. of a polyethylene glycol having an average molecular weight of about 1540 was melted and charged into a glass flask equipped with agitator and reflux condenser. The flask also had external heating and cooling facilities as well as provisions for maintaining a nitrogen blanket over the reactants to provide anhydrous conditions during reaction. The polyethylene glycol was in anhydrous form and was charged into the flask under anhydrous conditions. The polyethylene glycol charge was then cooled to about 50° C. under anhydrous conditions and under a nitrogen blanket. 216 g. of anhydrous xylene was then added to the glycol charge. The xylene and glycol mixture was agitated until uniform and cooled to about 35° C. 174 g. of tolylene diisocyanate was then added to the mixture over about ten minutes. The resulting reaction mixture was then heated with agitation to about 70° C. and agitated at about 70° to about 75° for about forty-five minutes to complete reaction. The resulting reaction product was an isocyanate terminated urethane prepolymer having an isocyanate content of 3.78% by weight.

(B) Preparation of a polyurethane resin

To 1110 g. of the isocyanate terminated urethane prepolymer obtained in part (A) above cooled at about 50° C., 111 g. of hydroxy ethyl carbamate was added with vigorous agitation. 0.5 g. of stannous octoate dissolved in 3.0 g. of anhydrous xylene was then added as a catalyst. The resulting reaction mixture was then heated to about 70° C. and reaction was completed by agitating the mixture at about 70° C. to about 75° C. for 1.5 hours. Analysis showed that the reaction product was a polyurethane resin which did not contain reactive isocyanate groups and had an isocyanate content of 0.0% by weight. The reaction product was a polyurethane resin which was dissolved in xylene. A partial vacuum was applied to the reaction product heated at 85° C. and 176 g. of xylene was removed under reduced pressure at about 85° C.

(C) Preparation of a polyurethane treating agent

To 1048 g. of the polyurethane resin obtained in part (B) above was added 258.4 g. of an aqueous formaldehyde solution containing 37% by weight of formaldehyde and 12.7 g. of 20% by weight sodium hydroxide solution. The proportions of reactants used in the agent were one mole of glycol, two moles of diisocyanate, two moles of carbamate and six moles of formaldehyde. The resulting reaction mixture was then heated with agitation to about 60° C. and reacted at about 60° to 65° C. for three hours to methylolate the polyurethane resin. The reaction product was then cooled to about 55° C. and 3.8 g. of glacial acetic acid added. The resulting treating agent was agitated until uniform. A 5% by weight aqueous solution of the treating agent had a pH of 5.6.

EXAMPLE XV

Preparation of a polyurethane treating agent 60.8 g. of the polyurethane treating agent obtained in part (C) of Example XIV above and 39.2 g. of distilled water were agitated at room temperature until a uniform mixture was obtained.

EXAMPLE XVI

Use of a polyurethane treating agent as a fabric coating 9.0 g. of the polyurethane treating agent obtained in Example I above was dispersed in water by gradually adding 90 g. of distilled water with agitation. The resulting treating agent dispersion was then agitated until uniform. 1.0 g. of 10% by weight aqueous zinc chloride solution was added to the treating agent dispersion and the resulting mixture agitated until uniform. Zinc chloride solution was added as a catalyst. The catalyst containing dispersion was then used as a padding bath. Fiber glass fabric was padded with this bath by passing the fabric through a threading of one dip and one nip on a Butterworth Padding Machine with 20 lb. roll pressure. A wet pickup of about 20% based on the weight of the fabric was obtained with the bath. The coated fabric was air-dried at room temperature on a pin frame and was then cured in an oven at 400° F. for two minutes. The cured coating on the fiber glass fabric was colorless and was suitable for dyeing.

EXAMPLE XVII

Use of a polyurethane treating agent as a fabric coating 9.0 g. of the polyurethane treating agent obtained in Example I above and 3.0 g. of a pigment, C.I. RB 31 iron oxide red were mixed to obtain a uniform dispersion. 87.0 g. of distilled water was gradually added with agitation to the dispersion. 1.0 g. of 10% by weight aqueous zinc chloride solution was then added to the dispersion and agitated until uniform. Zinc chloride solution was added as a catalyst for the treating agent. The catalyst containing treating agent dispersion was then used as a padding bath. Fiberglass fabric was padded with the bath by passing the fabric through a threading of one dip and one nip on a Butterworth Padding Machine with 20 lb. roll pressure. A wet pickup of about 20% based on the weight of the fabric was obtained with the bath. The coated fabric was airdried at room temperature on a pin frame and then cured in an oven at 400° F. for two minutes.

EXAMPLE XVIII

Use of a polyurethane treating agent as a fabric coating

A coating composition was prepared by mixing 10 g. of the polyurethane treating of Example I above, 1 g. of 10% by weight aqueous zinc chloride solution (catalyst), 90 g. of a 2.7% by weight solution of hydroxy ethyl cellulose (Cellosize WP300), 3 g. of C.I. RB 31 iron oxide red pigment and 1 g. of epoxidized soya bean oil (Paraplex G–62). The composition was mixed until a uniform dispersion was obtained. The coating composition was then used as a padding bath. Fiberglass fabric was padded with this bath by passing the fabric through a threading of one dip and one nip on a Butterworth Padding Machine with 20 lb. roll pressure. A wet pickup of about 20% based on the weight of the fabric was obtained with the bath. The coated fabric was then airdried at room temperature on a pin frame and was cured in an oven at 400° F. for two minutes.

EXAMPLE XIX

(A) Preparation of a polyurethane resin 557.5 g. of the isocyanate terminated urethane prepolymer obtained in part (A) of Example I above and 78.7 g. of hydroxy ethyl carbamate were mixed in a reaction flask under a nitrogen blanket and anhydrous conditions for about fifteen minutes at room temperature. 1.5 g. of a 20% by weight solution of stannous octoate in toluene was added to the reaction mixture as a catalyst and the mixture was stirred at about 30° C. for one hour. An exothermic reaction occurred during this period and the temperature of the reaction mixture rose from about 30° C. to about 50° C. The reaction mixture was then heated to about 70° C. and reacted at about 70° C. to about 75° C. for one hour. Analysis of the reaction product showed that it was a polyurethane resin which did not contain free isocyanate groups.

(B) Preparation of a polyurethane treating agent

A mixture of 91 g. of 37% by weight aqueous formaldehyde solution and 4.5 g. of a 20% by weight sodium hydroxide solution was charged over about 1.5 hours to the reaction mixture while the mixture was heated and agitated at between about 65° C. and 70° C. After this addition was completed, the reaction mixture was reacted an additional four hours at about 70° C. to obtain the desired polyurethane treating agent.

(C) Preparation of a polyurethane treating agent composition 77.2 g. of diethylenetriamine was then added to the agent obtained in part (B) above as a crosslinking agent and the resulting mixture reacted at about 70° C. The resulting reaction product was then vacuum distilled at about 70° C. to obtain a condensate which was substantially moisture free. The resulting condensate was the desired polyurethane treating agent composition. The proportions of reactants used in the agent were one mole of prepolymer, three moles of carbamate, 4.5 moles of formaldehyde and three moles of polyamine.

EXAMPLE XX

Preparation of an adhesive 31.7 g. of the polyurethane treating agent obtained in part (C) of Example XIX above and 11.4 g. of Epon Resin 828 were thoroughly mixed at room temperature. Epon Resin 828 was a diepoxide in the form of the diglycidyl derivative of 4,4-dihydroxy-diphenyl-dimethylmethane. The resulting mixture which was an adhesive was applied to wood to form a wood-to-wood bond. The resulting bond was cured at room temperature and found to be a fiber tearing bond. The compositions were also found to have excellent sealant properties.

EXAMPLE XXI

Preparation of a polyurethane treating agent 500.5 g. of the isocyanate terminated urethane prepolymer described in part (A) of Example I above was introduced into a glass flask which was equipped with heating and cooling facilities as well as provisions for maintaining a nitrogen atmosphere and anhydrous conditions during reaction. 52.5 g. of hydroxy ethyl carbamate was then charged to the flask. The resulting mixture was then stirred for about fifteen minutes under anhydrous conditions and in a nitrogen atmosphere. 29.25 g. of 2-diethylaminoethanol was then added to the reaction mixture over about fifteen minutes with agitation. An exothermic reaction occurred and the temperature of the reaction mixture rose to about 65° C. The reaction mixture was then heated to about 75° C. over a period of about 45 minutes. The reaction mixture was then heated with agitation at about 75° C. to about 80° C. for one hour. The reaction mixture was then heated to about 85° C. and reacted for an additional half-hour at about 85° C. to about 90° C. The resulting reaction mixture was then cooled to about 65° C. and 122.0 g. of 37% by weight of aqueous formaldehyde solution containing 1.1 g. of a 20% by weight aqueous sodium hydroxide solution was added with agitation over a 20 to 25 minute period. The proportions of reactants used in the treating agent were one mole of prepolymer, two moles carbamate, one mole of aminoethanol, six moles of formaldehyde and two moles of triamine. The mixture was then reacted for 1.5 hours at about 60° C. to about 65° C. to obtain a methylolated polyurethane resin. 51.5 g. of diethylenetriamine, a crosslinking agent was added to 705.3 g. of the methylolated polyurethane resin obtained above. The resulting mixture was then vacuum distilled at about 75° C. to obtain a dehydrated reaction product which was the desired treating agent.

EXAMPLE XXII

Use of a polyurethane treating agent as an adhesive 303 g. of the treating agent obtained in Example XXI above and 76 g. of Epon Resin 828 were thoroughly mixed to obtain an adhesive. The resulting adhesive was found to have adhesive properties similar to those described above in Example XX.

EXAMPLE XXIII

The polyurethane treating agent obtained in (C) of Example I above was mixed with an equimolar quantity of phenol. The resulting mixture was then applied to metal and cured by heating for about three to five minutes at about 300° F. to about 375° F. If desired, a catalyst can be added to the composition. The cured composition was found to be useful as a coating and an adhesive.

Further, 1670 g. of the polyurethane treating agent obtained in (C) of Example I above and 125 g. of dihydroxy diphenyl sulfone were mixed and the resulting mixture heated for about 20 to 30 minutes at about 60° C. to about 65° C. The proportions of reactants used were one mole of treating agent and one mole of sulfone. This composition was also of interest as a coating and an adhesive.

EXAMPLE XXIV

Use of a treating agent as a pigment binder

A coating composition was prepared by mixing 10 g. of the polyurethane treating agent obtained in Example I above, 1 g. of a 10% by weight aqueous zinc chloride solution (catalyst), 3 g. of C.I. RB 31 iron oxide red pigment, 1 g. of Unox Epoxide 221 (3,4-epoxycyclohexylmethyl 3,4, epoxycyclohexanecarboxylate) and 85 g. of distilled water. The composition was mixed until a uniform dispersion was obtained and used as a padding bath at room temperature. Fiberglass fabric was padded with the bath by passing the fabric through a threading of one dip and one nip on a Butterworth Padding Machine with a 20 lb. roll pressure. A wet pickup of 26.4% based on the weight of fabric was obtained with the bath. The coated fabric was then air dried at room temperature on a pin frame and cured in an oven at 400° F. for two minutes. The dry pickup was 3.0% based on the weight of the fabric. The cured pigmented coated glass fabric had excellent feel as well as resiliency. Further, the cured coating had outstanding adhesion and binding properties, that is, the coating adhered to the fabric and the pigment was firmly bound.

EXAMPLE XXV

The washfastness of the cured fiberglass sample obtained in Example XXIV was evaluated by placing a 4.5″ x 7″ sample of the cured fabric in a one-pint Launder-Ometer Jar which contained 200 cc. of a 0.2% by weight solution of a synthetic detergent (Tide) in water and ten rubber balls having diameters of about ⅜″. The jar was closed and placed in the Launder-Ometer at 130° F. and agitated for ten minutes. After ten minutes of agitation, the sample was removed from the jar and given a five-minute warm rinse. This test showed that the pigmented fabric was wash fast. The test was repeated four times, that is, a total of five washes. After five wash tests, the treated sample showed good pigment retention.

EXAMPLE XXVI

Use of a treating agent as a pigment binder 200 g. of the treating agent obtained in Example I above was mixed with 1800 g. of hydroxy ethyl cellulose (Cellosize WP 300) and 60 g. of C.I. RB 31 iron oxide red pigment. Then 20 g. of propylene carbonate and 20 g. of a 10% by weight aqueous oxalic acid solution were added and thoroughly mixed with the colored printing paste. Cotton fabric was then printed with the printing paste. The printed cotton fabric was cured at about 325° F. for about three minutes. Washfastness tests were made in the Launder-Ometer by the procedure given in Example XXV above. The cured samples of printed cotton fabric were found to have good pigment retention after five wash tests. No noticeable differences were noticed between the cured samples before and after the five washes.

EXAMPLE XXVII (A) Preparation of a prepolymer 300 g. of polyethylene glycol having an average molecular weight of about 600 and 174 g. of tolylene diisocyanate were charged into a glass flask equipped with agitator and reflux condenser. The flask was also equipped with external heating and cooling facilities as well as provisions for maintaining a nitrogen blanket over the reactant to provide anhydrous conditions during reaction. The two reactants were charged at 25° C. to the flask in anhydrous form, under anhydrous conditions and under a nitrogen blanket. An exothermic reaction occurred and the temperature gradually rose to about 40° C. without heating. The reaction mixture was then held at about 40° C. to about 45° C. for one hour. The reaction mixture was then heated to about 60° C. and held at about 60° C. for one hour. The reaction mixture was then heated gradually to 70° C. and reacted for about 10 to 15 minutes at 70° C. T°he resulting reaction product was then cooled to about 50° C. The reaction product was found to be an isocyanate terminated urethane prepolymer having an isocyanate content of about 8.55% by weight.

(B) Preparation of a polyurethane resin 491 g. (0.5 mole) of the isocyanate terminated urethane prepolymer obtained in part (A) above and 105 g. (1.0 mole) of hydroxy ethyl carbamate were mixed together under anhydrous conditions in a glass flask and 0.3 g. of a 20% by weight stannous octoate solution in toluene was added as a catalyst. An exothermic reaction occurred and the reaction temperature rose to about 85° C. The reaction mixture was then cooled to about 70° C. and reacted at about 70° C. to about 75° C. with agitation for about two hours to complete reaction. The resulting reaction product was a polyurethane resin.

(C) Preparation of a polyurethane treating agent

To 596 g. (0.5 mole) of the polyurethane resin obtained in part (B) above 244.5 g. (3 moles) of an aqueous formaldehyde solution containing 37% by weight of formaldehyde and 12.1 g. of a 20% aqueous sodium hydroxide solution was added over thirty minutes. The proportions of reactants used in the agent were one mole of glycol, two moles of diisocyanate, two moles of carbamate and six moles of formaldehyde. The resulting reaction mixture was then heated to about 60° C. and reacted at about 60° C. to about 70° C. for 2.5 hours to methylolate the polyurethane resin. 3.6 g. of glacial acetic acid was added to the resulting reaction product and the product stirred to obtain a uniform aqueous mixture of the treating agent which was a methylolated polyurethane resin. The treating agent can be reacted with diethylenetriamine and then Epon Resin 828 to obtain an adhesive for wood.

EXAMPLE XXVIII

Use of a polyurethane treating agent on cotton fabrics

An aqueous dispersion of the polyurethane treating agent described in Example X above containing 13% by weight of the treating agent and 1% by weight of a 25% by weight zinc acetate solution as a catalyst was prepared and used as a padding bath for cotton fabric. Cotton fabric was padded with the bath by passing the fabric through a threading of one dip and one nip on a Butterworth Padding Machine with a 10 lb. roll pressure. The coated cotton fabric was dried for five minutes at 200° F. and then cured at 325° F. for five minutes. A second sample of coated cotton fabric was prepared, dried for five minutes at 200° F. and then cured for ten minutes at 325° F. Samples of the treated fabrics were then tested for abrasion resistance on the Taber abraser to obtain the results shown in the table below as abrasion to rupture.

TABLE

| Composition Cured | Abrasion to rupture (No. of cycles) |
|---|---|
| Blank | 170 |
| 5 minutes at 325° F. | 4,100 |
| 10 minutes at 325° F. | 8,300 |

These data show that treatment of cotton fabric with the treating agents of the present invention resulted in marked improvement in the abrasion resistance properties of cotton fabric, that is, the ability of the fabric to resist abrasion was greatly increased over untreated cotton fabric, the Blank.

EXAMPLE XXIX

Preparation of a polyurethane treating agent

To 596 g. of the polyurethane resin obtained in part (B) of Example XXVII above was added over a thirty minute period 81.5 g. of aqueous formaldehyde solution containing 37% by weight formaldehyde and 12.1 g. of a 20% by weight aqueous sodium hydroxide solution. The resulting reaction mixture was then heated with agitation to about 60° C. and reacted at about 60° C. to about 65° C. for two hours to methylolate the polyurethane resin. The resulting methylolated polyurethane resin contained about one mole of prepolymer, two moles of hydroxy ethyl carbamate and two moles of formaldehyde. The methylolated resin was then mixed with 100 g. of distilled water and 50 g. of 99% by weight isopropanol to obtain the desired polyurethane treating agent.

EXAMPLE XXX 70.2 g. of the polyurethane treating agent obtained in Example XXVII and 2.1 g. of diethylenetriamine, a cross-linking agent, were mixed together and were dehydrated by heating to about 80° C. under reduced pressure. 7.6 g. of Epon Resin 828 were then mixed with the dehydrated reaction product. When this mixture was used as a wood adhesive, very strong wood-to-wood bonds were obtained after one hour of curing at room temperature.

EXAMPLE XXXI (A) Preparation of a prepolymer 492.9 g. of the polypropylene glycol 1025 having an average molecular weight of about 1025 and a hydroxyl number of 113.8 and 174 g. of tolylene diisocyanate were charged into a glass flask equipped with agitator and reflux condenser. The flask also had external heating and cooling facilities as well as provisions for maintaining a nitrogen blanket over the reactants to provide anhydrous conditions during reaction. The two reactants were charged at 25° C. to the flask in anhydrous form, under anhydrous conditions and under a nitrogen blanket. An exothermic reaction occurred in about thirty minutes and the temperature rose to about 40° C. The reaction mixture was held at about 40° C. to about 45° C. for one hour. The reaction mixture was then heated to about 60° C. and reacted at about 60° C. for one hour. The reaction mixture was then heated to about 70° C. and reacted at about 70° C. for about 15 to 30 minutes. The reaction product was an isocyanate terminated urethane prepolymer.

(B) Preparation of a polyurethane resin 105 g. of hydroxy ethyl carbamate was charged into a glass flask under anhydrous conditions at about 40° C. 677 g. of the isocyanate terminated urethane prepolymer obtained in part (A) above was added with agitation to the hydroxy ethyl carbamate. The two reactants were mixed for ten minutes under a nitrogen blanket and then 0.4 g. of a 20% by weight stannous octoate solution in toluene was added as a catalyst. After the addition of the catalyst, an exothermic reaction occurred and the reaction temperature rose to about 67° C. over a one hour period without heating. The reaction mixture was then heated to about 70° C. and reacted for about two hours at 70° C. to about 75° C. to obtain a polyurethane resin which was substantially free of reactive isocyanate groups.

(C) Preparation of a polyurethane treating agent 81.5 g. of aqueous formaldehyde solution containing 37% by weight of formaldehyde and 4.0 g. of 20% by weight aqueous sodium hydroxide solution was added over 25 minutes to the polyurethane resin obtained in part (B) above. After the addition was complete, the reaction mixture was heated for about two hours at 60° C. to 65° C. to complete reaction. The reaction product was the desired treating agent, a methylolated polyurethane resin. The proportions of reactants used in the agent were one mole of glycol, two moles of diisocyanate, two moles of hydroxy ethyl carbamate and two moles of formaldehyde.

EXAMPLE XXXII 173 g. of the polyurethane treating agent obtained in (C) of Example XXXI above was mixed with 22 g. of diethylenetriamine, a cross-linking agent. The reaction mixture was then heated with agitation to about 60° C. and then dehydrated by heating at about 60° C. under reduced pressure until a clear transparent condensation product was obtained. 76 g. of Epon Resin 828 was then mixed with the dehydrated condensate. The molar ratio of treating agent to Epon Resin was one mole to two moles. When the mixture of treating agent and Epon Resin was applied to wood, a fiber tearing bond was obtained after curing for one hour. When desired, the treating agent and resin can be dissolved separately in appropriate solvents and mixed before application to obtain varnish compositions. If desired, paints can be obtained by grinding pigment with one of the components in the varnish composition, that is, the treating agent or the resin.

EXAMPLE XXXIII

(A) Preparation of a polyurethane resin 523.7 g. of the isocyanate terminated urethane prepolymer obtained in part (A) of Example I above, 78.7 g. of hydroxy ethyl carbamate and 0.3 g. of a 20% by weight toluene solution of stannous octoate as a catalyst were mixed at room temperature. An exothermic reaction occurred and the reaction mixture was stirred until the temperature rose to 50° C. The mixture was then heated with agitation and reacted at 65° to about 75° C. for one hour to complete reaction. The reaction product was a polyurethane resin which did not contain reactive isocyanate groups.

(B) Preparation of a polyurethane treating agent 143 g. of an aqueous formaldehyde solution containing 37% by weight formaldehyde and 7 g. of a 20% by weight aqueous sodium hydroxide solution was added over one hour to 602.4 g. of the polyurethane resin obtained in part (A) above and heated to about 60° C. to about 65° C. The resulting reaction mixture was then reacted for about three hours at 60° C. to about 65° C. to complete reaction. The resulting reaction product was a methylolated polyurethane resin.

100 g. of the methylolated polyurethane resin obtained above was mixed with 0.26 g. of glacial acetic acid and 5 g. of an emulsifier which was an ethylene oxide condensate of one mole nonyl phenol and about 9 moles of ethylene oxide. Then 50 g. of a 10% by weight aqueous solution of a copolymer of maleic anhydride and ethylene was added and the resulting mixture which was the desired treating agent was then agitated until uniform.

EXAMPLE XXXIV (A) 16.4 g. of the emulsion described in part (B) of Example XXXIII above was slowly mixed with 83.6 g. of water to obtain a padding bath. Fiber glass fabric was then padded with the bath by passing the fabric through a threading of one dip and one nip on a Butterworth Padding Machine with a 20 lb. roll pressure. The coated fiberglass fabric was dried at room temperature and then cured at 400° F. for two minutes.

(B) 10 g. of the product obtained in part (B) of Example I above, 1 g. of a 10% by weight zinc chloride solution as a catalyst, 90 g. of a 2.7% by weight water dispersion of hydroxy ethyl cellulose (Cellosize WP 300), 3 g. of C.I. RB 31 iron oxide red pigment and 1 g. of epoxidized soya bean oil (Paraplex G-62) were mixed to obtain a padding bath. Fiber glass fabric was padded with the bath and the coated fabric cured as described in part (A) above.

(C) 10 g. of the polyurethane treating agent obtained in part (B) of Example I above, 1 g. of a 10% by weight zinc chloride solution as a catalyst, 3 g. of C.I. RB 31 iron oxide red pigment and 90 g. of water were used to prepare a padding bath. Fiber glass fabric was padded with the bath and the coated fabric cured as described in part (A) above.

(D) Samples of the cured coated fabrics obtained in parts (A) through (C) above were tested for abrasion resistance on the Taber abraser to obtain the results shown in the table below as abrasion to rupture.

TABLE

| Cured Composition of | Abrasion to rupture (No. of cycles) |
|---|---|
| Blank | 50 |
| (A) | 120 |
| (B) | 180 |
| (C) | 130 |

The data in the table show that treatment of fiber glass with the compositions of the present invention result in marked improvement in the abrasion resistance properties of fiber glass fabric. Abrasion resistance of the uncured, untreated fiber glass fabric is reported as the blank in the table.

EXAMPLE XXXV

Use of a treating agent in leather retanning

Chrome-stock leather was washed in a 200% float at 100° F. for thirty minutes. To the washed drained stock was then added a 100% float of fresh water at 100° F. 12.5% by weight of a 50% by weight isopropanol solution of the treating agent obtained in Example XXVII above was then added to the float in the drum and the drum was run for one hour to retan the leather. The leather was then drained and washed for five minutes at 100° F. using a long float. After draining the wash water, the retanned leather was then fat-liquored with 5% by weight based on the weight of leather of sulfated vegetable and animal oils in a 100% fresh water float at 100° F. for one hour. The retanned and fat-liquored leather was then pulled and horsed to drain. The leather was then wrung and tacked out to dry over a period of four hours at a temperature of about 122° F. During the retanning and fat-liquoring, both the treating agent which was the retanning agent and the fat-liquor were completely taken up by the stock and were fully exhausted from the tanning liquors. The treating agent produced retanned leather that was firmer and fuller than the chrome stock before retanning. Further, the treating agent also had a beneficial bleaching effect on the chrome stock.

EXAMPLE XXXVI

Use of a treating agent on cotton fabric 20 g. of the polyurethane treating agent obtained in part (B) of Example I above was mixed with 180 g. of distilled water and 2 g. of a 10% by weight oxalic acid solution to obtain a padding bath. Cotton fabric was padded with the bath by passing the fabric through a threading of one nip and one dip on a Butterworth Padding Machine with a 10 lb. roll pressnre. The coated fabric was airdried and then cured at 325° F. for ten minutes in an oven. The hand of the fabric was not impaired by treatment with the treating agent. A solution containing 1 g. of Cibalan Brilliant Yellow 3GL, C.I. Acid Yellow 114 was dissolved in 100 cc. of water. A solution containing 1 g. of ammonium sulfate in 100 cc. of water was also prepared. A dye bath was prepared by mixing 300 cc. of water, 20 cc. of the dye solution and 20 cc. of the ammonium sulfate solution described above. 10 g. of the treated cotton fabric obtained above was dyed for thirty minutes in the bath at a temperature of about 60° C. to about 80° C. The dyed fabric was rinsed in hot water and dried. A deep yellow shade was obtained and no leaching of the dye was observed. Further, the dyed fabric had good crock resistance.

EXAMPLE XXXVII

To 194 g. of the polyurethane treating agent obtained in part (B) of Example V above, 6 g. of Gafac RE–610, free acids of complex phosphate esters was added and agitated until a uniform mixture was obtained.

EXAMPLE XXXVIII 3200 g. of the treating agent obtained in part (B) of Example I was reacted with 252 g. of melamine. The reactants were agitated and heated at a temperature of about 70° C. to about 75° C. for one hour to complete reaction. 326 g. of aqueous 37% by weight formaldehyde solution was added to the reaction product obtained above. The formaldehyde was added over thirty minutes at about 70° C. and the resulting reaction mixture was reacted for ninety minutes at 70° C. to about 75° C. The reaction product was a viscous resinous material having increased cationic characteristics and adhesive properties.

What is claimed is:

1. A polyurethane treating agent which is a composition comprising
    (A) a polyurethane treating agent which is an alkylolated polyurethane resin which comprises a condensation product of
        (1) a polyurethane resin which comprises the reaction product of
            (a) at least about one mole of hydroxy ethyl carbamate,
            (b) about one mole of a polyisocyanate selected from the group consisting of (i) an organic polyisocyanate and (ii) an isocyanate terminated urethane prepolymer, said prepolymer being the reaction product of an organic polyisocyanate and at least one member selected from the group consisting of a polyol, a polyether and a polyester each having at least two terminal hydroxyl groups, the ratio of said member to said isocyanate being at least 1.1 isocyanate group per terminal hydroxyl group, and
            (c) about 0 to about one mole of a hydroxyl terminated compound selected from the group consisting of a polyol, a polyether, a polyester, a monohydric alcohol and a monohydric phenol, with the proviso that said polyurethane resin is substantially free of reactive isocyanate groups, and
        (2) from about one to about three moles of an aldehyde selected from the group consisting of an aldehyde having from one to seven carbon atoms and an aldehyde liberating composition per terminal urethane group present in said resin,
    (B) from about 0 to about one mole per reactive tertiary amine group present in said alkylolated polyurethane resin of an acid selected from the group consisting of water soluble inorganic acids and water soluble organic acids containing from one to four carbon atoms,
    (C) from about 0 to about 20% by weight of said alkylolated polyurethane resin of a surfactant,
    (D) from about 0 to about one mole per reactive hydrogen atom present in said alkylolated polyurethane resin of an epoxide having at least eight carbon atoms,
    (E) from about 0 to about one mole per reactive alkylol group present in said alkylolated polyurethane resin of a crosslinking agent reactive with alkylol groups,
    (F) from about 0 to about 40% by weight of said alkylolated polyurethane resin of a pigment, and
    (G) from about 0 to about 99% by weight of said alkylolated polyurethane resin of a solvent.

2. The composition of claim 1 wherein said prepolymer is the reaction product of tolylene diisocyanate and a propylene oxide adduct of trimethylolpropane, said hydroxyl terminated compound is diethylaminoethanol, said acid is acetic acid and said solvent is isopropanol.

3. A process for preparing a composition comprising a polyurethane treating agent which comprises
    (I) reacting at about 25° C. to about 160° C.
        (A) at least about one mole of hydroxy ethyl carbamate, with
        (B) about one mole of a polyisocyanate selected from the group consisting of (i) an organic polyisocyanate and (ii) an isocyanate terminated urethane prepolymer, said prepolymer being the reaction product of an organic polyisocyanate and at least one member selected from the group consisting of a polyol, a polyether and a polyester, each having at least two terminal hydroxyl groups, the ratio of said member to said isocyanate being at least 1.1 isocyanate group per terminal hydroxyl group, and
        (C) about 0 to about one mole of a hydroxyl terminated compound selected from the group consisting of a polyol, a polyether, a polyester, a monohydric alcohol and a monohydric phenol
to obtain a polyurethane resin, said polyurethane resin being substantially free of reactive isocyanate groups,
    (II) condensing from about one mole to about three moles of an aldehyde selected from the group consisting of an aldehyde having from one to seven carbon atoms and an aldehyde liberating composition with each terminal urethane group present in said polyurethane resin at about 5° C. to about 110° C. to obtain an alkylolated polyurethane resin, and thereafter
    (III) adding
        (A) from about 0 to about one mole per reactive tertiary amine group present in said alkylolated polyurethane resin of an acid selected from the group consisting of a water soluble inorganic acid and a water soluble organic acid containing from one to four carbon atoms,
        (B) from about 0 to about 20% by weight of said alkylolated polyurethane resin of a surfactant, (C) from about 0 to about one mole per reactive hydrogen atom present in said alkylolated polyurethane resin of an epoxide having at least eight carbon atoms, (D) from about 0 to about one mole per reactive alkylol group present in said alkylolated polyurethane resin of a cross-linking agent reactive with alkylol groups, (E) from about 0 to about 40% by weight of said alkylolated polyurethane resin of a pigment, and (F) from about 0 to about 99% by weight of said alkylolated polyurethane resin of a solvent to obtain said composition.

4. The process of claim 3 wherein said prepolymer is the reaction product of tolylene diisocyanate and a propylene oxide adduct of trimethylolpropane, said hydroxyl terminated compound is diethylaminoethanol, said acid is acetic acid and said solvent is isopropanol.

References Cited

UNITED STATES PATENTS

| | | | |
|---|---|---|---|
| 2,703,810 | 3/1955 | Viard | 260—471 |
| 2,829,984 | 4/1958 | Yaeger | 117—132 |
| 2,928,812 | 3/1960 | Ernst | 260—67.5 |
| 3,043,801 | 7/1962 | Wagner et al. | 260—47 |
| 3,076,007 | 1/1963 | Barclay et al. | 260—453 |
| 3,144,299 | 8/1964 | Frick et al. | 8—116.3 |
| 3,242,108 | 3/1966 | McGary | 260—2.5 |
| 3,248,373 | 4/1966 | Barringer | 260—77.5 |
| 3,264,134 | 8/1966 | Vill et al. | 117—63 |
| 3,384,606 | 5/1968 | Dieterich et al. | 260—29.4 |
| 3,392,148 | 8/1968 | Zech et al. | 260—67 |

DONALD E. CZAJA, Primary Examiner

H. S. COCKERAM, Assistant Examiner

U.S. Cl. X.R.

117—126, 139.5, 142, 143; 161—190; 162—164, 179; 260—77.5, 2, 18, 67, 47, 29.2, 31.2, 33.4, 33.6, 33.8, 32.8, 22, 37, 40, 858